US009430754B2

(12) United States Patent
Imai

(10) Patent No.: US 9,430,754 B2
(45) Date of Patent: Aug. 30, 2016

(54) STORAGE MEDIUM, INFORMATION PROCESSING METHOD AND INFORMATION PROCESSING SYSTEM

(75) Inventor: Daiji Imai, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 704 days.

(21) Appl. No.: 12/830,829

(22) Filed: Jul. 6, 2010

(65) Prior Publication Data

US 2011/0173557 A1 Jul. 14, 2011

(30) Foreign Application Priority Data

Jan. 13, 2010 (JP) ................. 2010-004611

(51) Int. Cl.
*G06F 15/16* (2006.01)
*G06Q 10/10* (2012.01)

(52) U.S. Cl.
CPC ............ *G06Q 10/10* (2013.01); *G06Q 10/107* (2013.01)

(58) Field of Classification Search
CPC ........................... G06Q 10/10; G06Q 10/107
USPC .................. 709/201–226; 715/770–780; 345/80–110
See application file for complete search history.

(56) References Cited

U.S. PATENT DOCUMENTS

| 7,506,263 | B1 | 3/2009 | Johnston et al. |
| 7,539,697 | B1 * | 5/2009 | Akella et al. |
| 7,746,906 | B2 * | 6/2010 | Jinzaki et al. ................. 370/503 |
| 7,853,977 | B2 * | 12/2010 | Sakamoto ....................... 725/59 |
| 8,468,450 | B2 * | 6/2013 | Yamaguchi ........ H04N 1/00411 341/176 |
| 2004/0243679 | A1 | 12/2004 | Tyler |
| 2005/0039132 | A1 * | 2/2005 | Germain et al. .............. 715/736 |
| 2007/0077991 | A1 | 4/2007 | Horigome |
| 2007/0171820 | A1 * | 7/2007 | Matsunaga .................... 370/229 |
| 2007/0203991 | A1 * | 8/2007 | Fisher et al. .................. 709/206 |
| 2008/0119281 | A1 * | 5/2008 | Hirose et al. ................... 463/42 |
| 2009/0192861 | A1 * | 7/2009 | Suzuki et al. .................... 705/8 |
| 2010/0146118 | A1 * | 6/2010 | Wie .............................. 709/225 |

(Continued)

FOREIGN PATENT DOCUMENTS

| JP | 2002-73002 A | 3/2002 |
| JP | 2004-127140 A | 4/2004 |

(Continued)

OTHER PUBLICATIONS

Japanese Patent Office, "Notification of Reason(s) for Refusal," (5 pages) issued in connection with Japanese Patent Application No. 2014-124867, dated May 26, 2015, along with its English language Translation (5 pages).

(Continued)

*Primary Examiner* — Frantz Jean
(74) *Attorney, Agent, or Firm* — Nixon & Vanderhye P.C.

(57) ABSTRACT

A game apparatus includes a CPU, and a relationship diagram displaying screen is displayed on a second LCD according to an instruction from a first user of the game apparatus. On the relationship diagram displaying screen, a display manner of an arrow displayed between a user image of the first user and a user image of a second user of another game apparatus is changed. The thickness and the color of the arrow on the side of the user image of the second user are set on the basis of the degree of transmission of the message data transmitted by the first user to the second user. Furthermore, the thickness and the color of the arrow on the side of the user image of the first user are set on the basis of the degree of reception of the message data received by the first user from the second user.

11 Claims, 26 Drawing Sheets

(56) References Cited

U.S. PATENT DOCUMENTS

2010/0228582 A1* 9/2010 King et al. .................. 705/7
2011/0302517 A1* 12/2011 Duchene et al. ............ 715/771

FOREIGN PATENT DOCUMENTS

JP          2008-269053         11/2008
JP          2009-60527 A         3/2009

OTHER PUBLICATIONS

Ogata et al., "PeCo-Mediator-II: Supporting to Find Partner(s) through Personal Connections in a Networked Environment", Transactions of the Institute of Electronics, Information and Communication Engineers, Japan, published by The Institute of Electronics, Information and Communication Engineers on Jul. 25, 1997, No. 307, pp. 551-560, along with Machine English language Translation of the Abstract (1 page).

Ogata et al., "PeCo-Mediator: Development and Modeling of a Supporting System for Sharing and Handling Personal Connections", Transactions on Information Processing Society of Japan, Japan, published by Information Processing Society of Japan, on Jun. 15, 1995, vol. 36, No. 6, pp. 1299-1309, along with its English language Abstract (1 page, p. 1299).

"Mail mo denwabangou mo korede kanpeki, Address Management Technique", Nikkei Personal Computing, Japan, published by Nikkei Business Publications, Inc. on Jan. 26, 2009, No. 570, pp. 44-49 (publication showing well-known technology).

* cited by examiner

FIG. 2
(A) TOP SURFACE VIEW (FOLDED STATE)
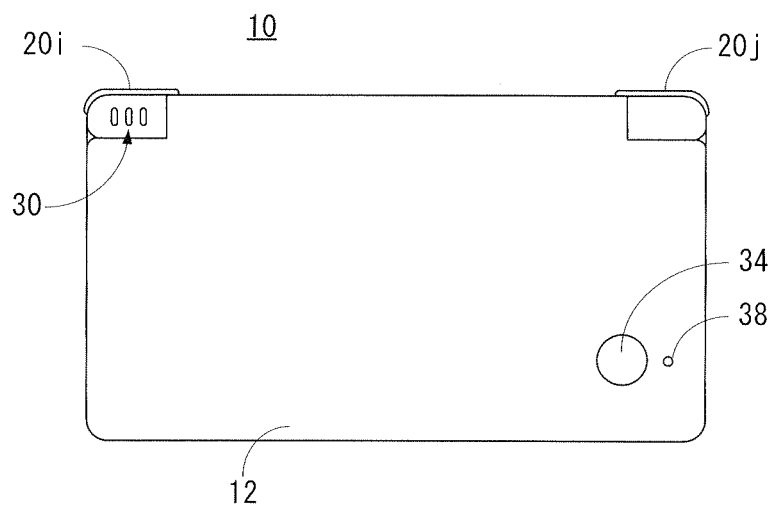
(B) LEFT SIDE SURFACE VIEW (FOLDED STATE)
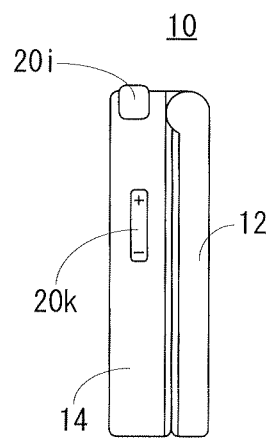

FIG. 8

(A) FIRST USER→SECOND USER : EQUAL TO OR LESS THAN 10
SECOND USER→FIRST USER : EQUAL TO OR LESS THAN 10

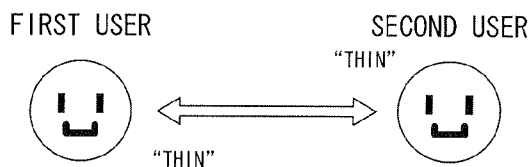

(B) FIRST USER→SECOND USER : EQUAL TO OR MORE THAN 11
AND EQUAL TO OR LESS THAN 30
SECOND USER→FIRST USER : EQUAL TO OR LESS THAN 10

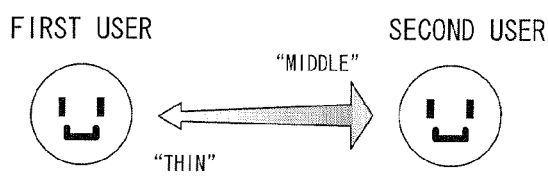

(C) FIRST USER→SECOND USER : EQUAL TO OR MORE THAN 31 AND THERE IS
TRANSMISSION WITHIN ONE WEEK
SECOND USER→FIRST USER : EQUAL TO OR MORE THAN 31, BUT THERE IS
NO RECEPTION WITHIN ONE WEEK

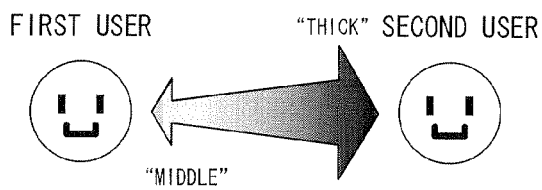

(D) FIRST USER→SECOND USER : EQUAL TO OR MORE THAN 31 AND THERE IS
TRANSMISSION WITHIN ONE WEEK
SECOND USER→FIRST USER : EQUAL TO OR MORE THAN 31 AND THERE IS
RECEPTION WITHIN ONE WEEK

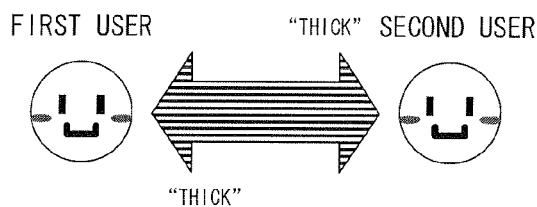

FIG. 10

(A) TRANSMITTED MESSAGE MANAGEMENT TABLE

| MESSAGE ID | RECEIVED-FLAG |
|---|---|
| A | ON |
| B | OFF |
| C | OFF |
| ⋮ | ⋮ |
| N | ON |

(B) TRANSMISSION AND RECEPTION MANAGING TABLE

| USER ID OF COMMUNICATION OBJECT | THE NUMBER OF TRANSMISSION | LATEST TRANSMITTING TIME | THE NUMBER OF RECEPTIONS | LATEST RECEIVING TIME |
|---|---|---|---|---|
| AAAA | 3 | 091016211436 | 15 | 091129093507 |
| BBBB | 45 | 091224183045 | 37 | 091224084011 |
| CCCC | 20 | 091220122223 | 10 | 091210215904 |
| ⋮ | ⋮ | ⋮ | ⋮ | ⋮ |

FIG. 22

(A) FIRST USER→SECOND USER : EQUAL TO OR LESS THAN 10
SECOND USER→FIRST USER : EQUAL TO OR LESS THAN 10

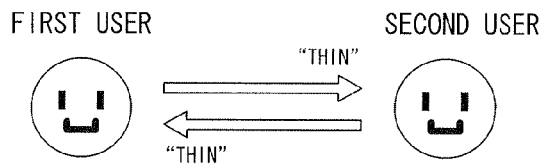

(B) FIRST USER→SECOND USER : EQUAL TO OR MORE THAN 11
AND EQUAL TO OR LESS THAN 30
SECOND USER→FIRST USER : EQUAL TO OR LESS THAN 10

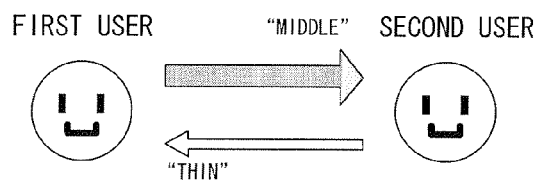

(C) FIRST USER→SECOND USER : EQUAL TO OR MORE THAN 31, AND THERE IS
TRANSMISSION WITHIN ONE WEEK
第SECOND USER→FIRST USER : EQUAL TO OR MORE THAN 31, BUT THERE
IS NO RECEPTION WITHIN ONE WEEK

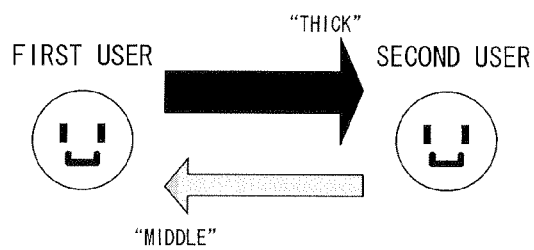

(D) FIRST USER→SECOND USER : EQUAL TO OR MORE THAN 31, AND THERE IS
TRANSMISSION WITHIN ONE WEEK
SECOND USER→FIRST USER : EQUAL TO OR MORE THAN 31, AND THERE IS
RECEPTION WITHIN ONE WEEK

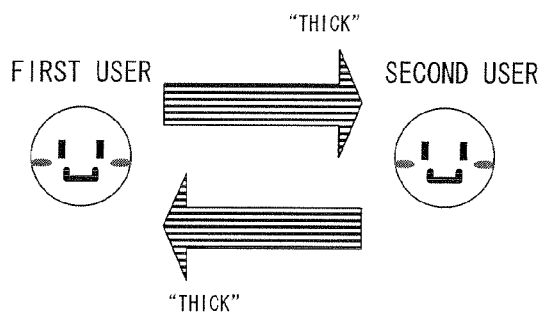

FIG. 26
(A)
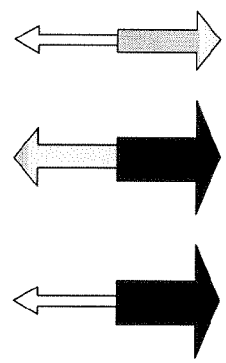
(B)
(C)
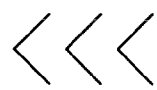
(D)
(E)
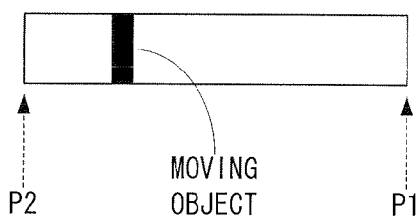

STORAGE MEDIUM, INFORMATION PROCESSING METHOD AND INFORMATION PROCESSING SYSTEM

CROSS REFERENCE OF RELATED APPLICATION

The disclosure of Japanese Patent Application No. 2010-4611 is incorporated herein by reference.

BACKGROUND AND SUMMARY

1. Technical Field

The technology presented herein relates to a storage medium, an information processing method and an information processing system. More specifically, the present technology relates to a storage medium, an information processing method and an information processing system which performs transmission and reception of messages with other information processing apparatuses.

2. Description of the Related Art

One example of the related art is disclosed in Japanese Patent Application Laid-Open No. 2008-269053 [G06F 17/13, G06Q 10/00] (document 1) laid-open on Nov. 6, 2008. A personal connection block diagram creating apparatus of the document 1 creates a personal connection block diagram by acquiring the thickness, the length, the direction of an arrow from a table according to the strength of the friendship depending on the number of distributions of e-mail messages from a table, and connecting circle designs representing respective persons by using the acquired arrow.

However, the personal connection block diagram creating apparatus of the document 1 decides the thickness, the length and the direction of the arrow depending on a total number of receptions and a total number of distributions of the e-mail messages as to a source of the distribution (hereinafter referred to as "terminal A") and a destination of the distribution (hereinafter referred to as "terminal B") and the magnitude of the number of distributions and the number of receptions, and therefore, it is impossible to independently visually grasp both of the number of distributions of the e-mail messages transmitted (distributed) to the terminal B and the number of receptions of e-mail messages received from the terminal B in the terminal A by viewing the personal connection block diagram. That is, it is impossible to independently know the degree of favor, by the user of the terminal. A with respect to the user of the terminal B, and the degree of favor by the user of the terminal B with respect to the terminal A. Thus, it is impossible to grasp the strength of the friendship between the users. More specifically, according to the table shown in FIG. 16 in the document 1, assuming that the number of receptions and the number of distributions of e-mail messages between the terminal A and the terminal B is 30, between a case that the number of distributions of the e-mail messages transmitted from the terminal A to the terminal B is 16 and the number of receptions of the e-mail messages received by the terminal A from the terminal B is 14, and a case that the number of distributions of the e-mail messages transmitted from the terminal A to the terminal B is 29 and the number of receptions of the e-mail messages received by the terminal A from the terminal B is 1, the thickness, the length and the direction of the arrow are made equal. From the former case, both of the terminals have a favor to each other to make communications can be assumed, and from the latter case, substantially one-way communications are made can be assumed. However, these are represented by the same arrow, and this makes it impossible to precisely represent the strength of the friendship by the arrow. Furthermore, in a case that the strength of the friendship between the terminal A and the terminal B is shown by B and C in the table, only one-way favor can be understood.

Therefore, a feature of the present technology is to provide a novel storage medium, a novel information processing method and a novel information processing system.

Furthermore, another feature of the present technology is to provide a storage medium, an information processing method and an information processing system which are able to precisely and easily grasp the degree of favor of each user and the strength of the friendship between users.

A first embodiment is a storage medium storing an information processing program. The information processing program causes a computer of an information processing apparatus to function as a transmitter, a degree of transmission detector, a receiver, a degree of reception detector, and an index displayer. The transmitter transmits data to other information processing apparatus. For example, the transmitter transmits data to other information processing apparatus via a network and a server, or directly. The degree of transmission detector detects a degree of transmission of the data transmitted by the transmitter. The receiver receives data from the other information processing apparatus. Similar to the transmitter, the receiver receives data from other information processing apparatus via the network and the server, or directly. The degree of reception detector detects a degree of reception of the data received by the receiver. The index displayer displays on a display an index such that the degree of transmission detected by the degree of transmission detector and the degree of reception detected by the degree of reception detector are individually identifiable manner. For example, the display may be provided to be integrated with the information processing apparatus, and may separately be provided from the information processing apparatus.

According to the first embodiment, an index of the manner that can individually identify the degree of transmission of the data to other information processing apparatus and the degree of reception of the data from the other information processing apparatus is displayed, thus it is possible to precisely and easily grasp a favor from one to the other and a favor from the other to the one which are represented by the degree of transmission and the degree of reception. That is, it is possible to precisely and easily grasp the strength of the friendship represented by the degree of transmission of the data and the degree of reception of the data.

In a second embodiment the data is message data, and the information processing program causes a computer of the information processing apparatus to further function as a register, a message creator, and a destination designator. The register registers identification information of the other information processing apparatus in an identification information storage. That is, the other information processing apparatus is registered as an object to which the message data is to be transmitted and from which the message data is to be received. The message creator creates message data. The destination designator designates one identification information as a destination from the identification information of the other information processing apparatus which is registered in the identification information storage. Here, a plurality of identification information may be designated as destinations. The transmitter transmits the message data created by the message creator to the other information processing apparatus indicated by the identification information as to the destination designated by the destination designator.

According to the second embodiment, the degree of transmission of the message data and the degree of reception of the message data can be separately identified with the other information processing apparatuses which is registered, and therefore, it is possible to easily and visually grasp the degree of transmission and the degree of reception, and thus, it is possible to easily grasp the favor from one to other, and the favor from the other to the one, moreover the precise strength of the friendship represented by the degree of transmission and the degree of reception.

In a third embodiment the information processing program causes the computer of the information processing apparatus to further function as a design displayer. The design displayer displays on the display a first design representing its own information processing apparatus and a second design representing the other information processing apparatus. The index displayer displays the index between the first designs and the second design.

According to the third embodiment, each of the design of the information processing apparatus which transmits and receives the message data is displayed, the index is displayed therebetween, and therefore, it is possible to visually easily recognize the sender, the receiver, the degree of transmission and the degree of reception of the message data.

In a fourth embodiment the index displayer displays as the index a two-way arrow which changes in thickness on a side of the first design in accordance with the degree of reception, and changes in thickness on a side of the second design in accordance with the degree of transmission. For example, in a case that the degree of reception is high, the thickness of the arrow on the side of the first design is made thick whereas in a case that the degree of reception is low, the thickness of the arrow on the side of the first design is made thin. Similarly, in a case that the degree of transmission is high, the thickness of the arrow on the side of the second design is made thick whereas in a case that the degree of transmission is low, the thickness of the arrow on the side of the second design is made thin.

According to the fourth embodiment, the arrow indicating the two-way direction is changed in thickness on the side of the design representing its own information processing apparatus and on the side of the design representing the other information processing apparatus, capable of easily grasping the degree of transmission and the degree of reception.

In a fifth embodiment the index displayer displays as the index a first arrow which changes in thickness in accordance with the degree of transmission and is directed from the first design to the second design, and a second arrow which changes in thickness in accordance with the degree of reception and is directed from the second design to the first design. For example, in a case that the degree of reception is high, the thickness of the arrow directed from the second design to the first design is made thick whereas in a case that the degree of reception is low, the thickness of the arrow directed from the second design to the first design is made thin. Similarly, in a case that the degree of transmission is high, the thickness of the arrow directed from the first design to the second design is made thick whereas in a case that the degree of transmission is low, the thickness of the arrow directed from the first design to the second design is made thin.

According to the fifth embodiment as well, similar to the fourth embodiment, it is possible to easily grasp the degree of transmission and the degree of reception.

In a sixth embodiment the degree of transmission detector detects the number of transmissions of the data transmitted by the transmitter. Furthermore, the degree of reception detector detects the number of receptions of the data received by the receiver. The index displayer index displayer displays the index of the manner that can individually identify the number of transmissions and the number of receptions.

According to the sixth embodiment, the number of transmissions and the number of receptions are merely detected, and therefore, it is possible to easily know the degree of transmission and the degree of reception. Furthermore, it is possible to display the index such that the number of transmissions and the number of receptions are individually identifiable manner.

In a seventh embodiment the information processing program causes a computer of the information processing apparatus to further function as a transmitting and receiving condition determiner. The transmitting and receiving condition determiner determines whether or not the degree of transmission and the degree of reception satisfy a predetermined condition. The index displayer displays an index in a first manner when the transmitting and receiving condition determiner determines that the degree of transmission and the degree of reception satisfy the predetermined condition, and displays an index in a second manner different from the first manner when the transmitting and receiving condition determiner determines that at least one of the degree of transmission and the degree of reception does not satisfy the predetermined condition. For example, in a case that the degree of transmission and the degree of reception satisfy the predetermined condition, and both of the degree of transmission and the degree of reception are determined to be high, an index of the manner showing that the strength of the friendship is high is displayed. Furthermore, in a case that the degree of transmission and the degree of reception satisfy the other predetermined condition, and both of the degree of transmission and the degree of reception are determined to be low, an index of the manner showing that strength of the friendship is low is displayed.

According to the seventh embodiment, only when both of the degree of transmission and the degree of reception satisfy the predetermined condition, the manner of the index is further changed, and therefore, it is possible to easily recognize whether or not both of the degree of transmission and the degree of reception satisfy the predetermined condition.

In an eighth embodiment the information processing program causes a computer of the information processing apparatus to further function as a transmitting and receiving condition determiner. The transmitting and receiving condition determiner determines whether or not the degree of transmission and the degree of reception satisfy a predetermined condition. The design displayer displays a design in a third manner when the transmitting and receiving condition determiner determines that the degree of transmission and the degree of reception satisfy the predetermined condition, and displays a design in a fourth manner different from the third manner when the transmitting and receiving condition determiner determines that at least one of the degree of transmission and the degree of reception does not satisfy the predetermined condition. For example, in a case that the degree of transmission and the degree of reception satisfy the predetermined condition, and both of the degree of transmission and the degree of reception are determined to be high, the design of the manner showing that the strength of the friendship is high is displayed. Furthermore, in a case that the degree of transmission and the degree of reception satisfy the other predetermined condition, and both of the degree of transmission and the degree of reception are determined to be low, the design of the manner showing that the strength of the friendship is low is displayed.

In the eighth embodiment as well, similar to the seventh embodiment, it is possible to easily recognize whether or not both of the degree of transmission and the degree of reception satisfy the predetermined condition.

In a ninth embodiment the transmitting and receiving condition determiner determines that the predetermined condition is satisfied in a case that the number of transmissions of the data and the number of receptions of the data are equal to or more than a constant number, and the data transmission and the data reception are performed during a predetermined period, and determines that the predetermined condition is not satisfied in a case that at least one of the number of transmissions of the data and the number of receptions of the data is less than the constant number or in a case that at least one of the data transmission and the data reception is not performed during the predetermined period. That is, by the number of transmissions of the message data, the transmission frequency, the number of receptions, and the reception frequency, it is determined whether or not the degree of transmission and the degree of reception satisfy the predetermined condition. Thus, for example, it is grasp whether or not the data transmission and the data reception are continuously and frequently performed, and it is determined whether or not the strength of the friendship between the users is high.

According to the ninth embodiment, the manner of the design and the index is changed depending on the total number of data transmissions and the total number of data receptions, and the presence or absence of the transmission of the data and the presence or absence of reception of the data during the predetermined period, capable of grasping the more precise strength of the friendship.

Here, the predetermined condition need not to be restricted thereto, and may be set to a condition that the number of transmissions of the data and the number of receptions of the data is less than the constant number (less than the aforementioned constant number), and the data transmission and the data reception are not performed for a predetermined period or more (longer than the above-described predetermined time). In such a case, unlikely to the aforementioned case, it is possible to determine whether or not the strength of the friendship is low.

A tenth embodiment is an information processing method, and following steps of (a) transmitting data to other information processing apparatus; (b) detecting a degree of transmission of the data transmitted by the step (a); (c) receiving data from the other information processing apparatus; (d) detecting a degree of reception of the data received by the step (c), and (e) displaying on a display an index of the manner that can individually identify the degree of transmission detected by the (b) and the degree of reception detected by the (d).

According to the tenth embodiment as well, similar to the first embodiment, it is possible to accurately and easily grasp the strength of the friendship represented by the degree of transmission of the data and the degree of reception of the data.

An eleventh embodiment is an information processing system, and comprises: a transmitter which transmits data to other information processing apparatus; a degree of transmission detector which detects a degree of transmission of the data transmitted by the transmitter; a receiver which receives data from the other information processing apparatus; a degree of reception detector which detects a degree of reception of the data received by the receiver; and an index displayer which displays on a display an index of the manner that can individually identify the degree of transmission detected by the degree of transmission detector and the degree of reception detected by the degree of reception detector. For example, the information processing system is made up of a separate computer including each means or a plurality of computers including two or more means. Furthermore, the information processing system may be made up of one computer including all the means.

According to the eleventh embodiment as well, similar to the first embodiment, it is possible to accurately and easily grasp the strength of the friendship represented by the degree of transmission of the data and the degree of reception of the data.

The above described features, aspects and advantages of the present technology will become more apparent from the following detailed description of the present technology when taken in conjunction with the accompanying drawings.

BRIEF DESCRIPTION OF THE DRAWINGS

FIG. 2 is an illustrative view showing a top and a left side surface of the game apparatus in a folded state shown in FIG. 1;

FIG. 8 is an illustrative view showing a display example of a user image and an arrow in a case that the strength of the friendship is represented;

FIG. 10 is an illustrative view showing one example of a transmitted message management table indicated by transmitted message managing data shown in FIG. 9 and one example of a transmission and reception managing table indicted by transmission and reception managing data;

FIG. 22 is an illustrative view showing another display example of a user image and an arrow in a case that the strength of the friendship is represented;

FIG. 26 is an illustrative view showing an example of other arrows and examples of indexes other than the arrow.

DETAILED DESCRIPTION OF THE PREFERRED EMBODIMENTS

Figure 1:
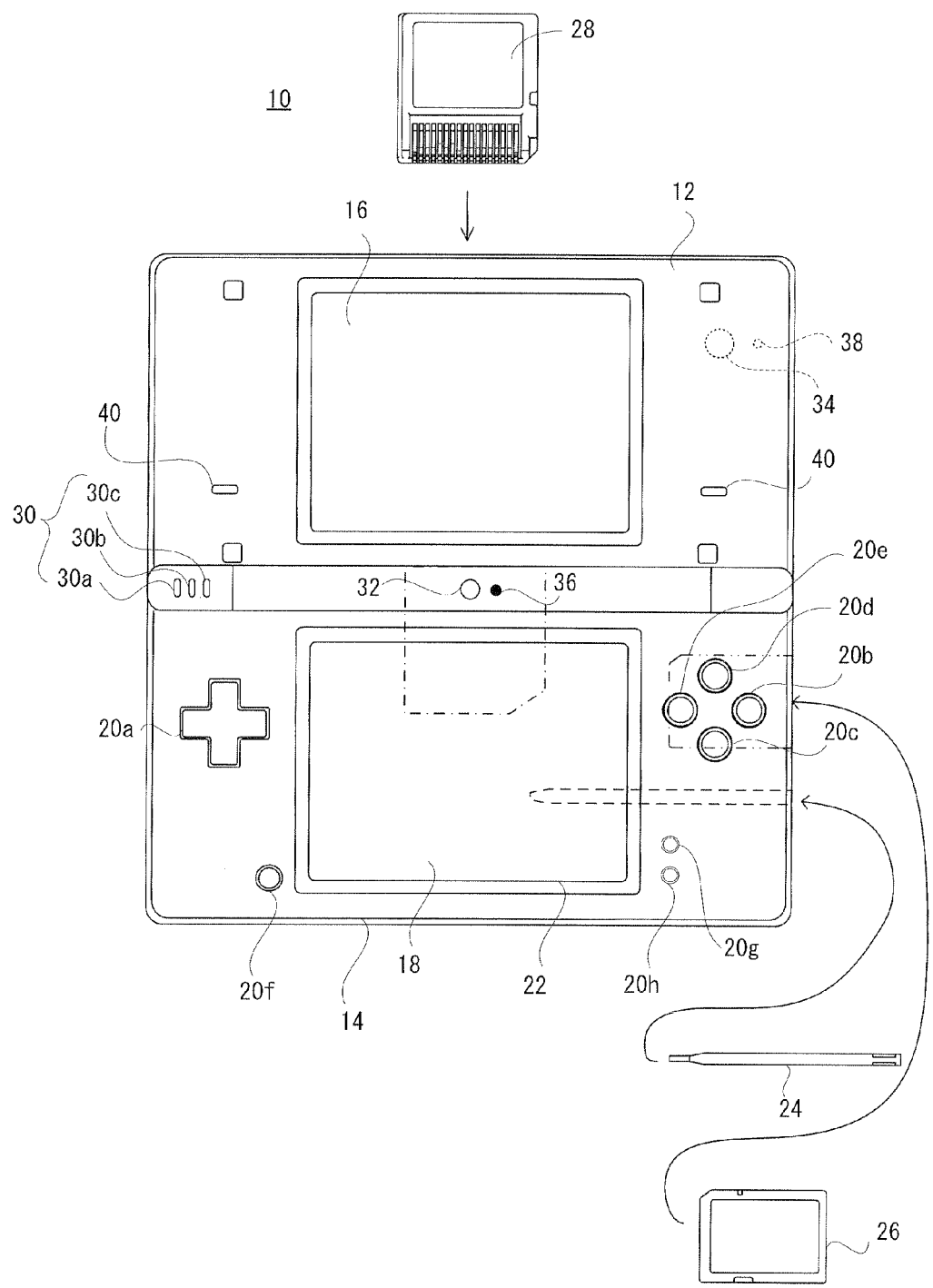
FIG. 1 is an illustrative view showing an appearance of a game apparatus of the present technology presented herein.

Referring to FIG. 1, a game apparatus 10 functioning as an information processing apparatus of one embodiment includes an upper housing 12 and a lower housing 14, and the upper housing 12 and the lower housing 14 are connected with each other so as to be opened or closed (foldable). In FIG. 1 example, the upper housing 12 and the lower housing 14 are constructed in the form of a horizontally long rectangular plate, and are rotatably connected with each other at the long sides of both of the housings. That is, the game apparatus 10 of this embodiment is a folding handheld game apparatus, and in FIG. 1, the game apparatus 10 is shown in an opened state (in an open state). The game apparatus 10 is constructed such a size that the user can hold with both hands or one hand even in the open state.

Generally, the user uses the game apparatus 10 in the open state. Furthermore, the user keeps the game apparatus 10 in a close state when not using the game apparatus 10. Here, the game apparatus 10 can maintain an opening and closing angle formed between the upper housing 12 and the lower housing 14 at an arbitrary angle between the close state and open state by a friction force, etc. exerted at the connected portion as well as the aforementioned close state and open state. That is, the upper housing 12 can be fixed with respect to the lower housing 14 at an arbitrary angle.

Additionally, the game apparatus 10 is mounted with a camera (32, 34) described later, functioning as an imaging device, such as imaging an image with the camera (32, 34), displaying the imaged image on the screen, and saving the imaged image data.

As shown in FIG. 1, the upper housing 12 is provided with a first LCD 16, and the lower housing 14 is provided with a second LCD 18. The first LCD 16 and the second LCD 18 take a horizontally-long shape, and are arranged such that the directions of the long sides thereof are coincident with the long sides of the upper housing 12 and the lower housing 14. For example, resolutions of the first LCD 16 and the second LCD 18 are set to 256 (horizontal)×192 (vertical) pixels (dots).

In addition, although an LCD is utilized as a display in this embodiment, an EL (Electronic Luminescence) display, a plasmatic display, etc. may be used in place of the LCD. Furthermore, the game apparatus 10 can utilize a display with an arbitrary resolution.

As shown in FIG. 1 and FIG. 2, the lower housing 14 is provided with respective operation buttons 20a-20k as input devices. Out of the respective operation buttons 20a-20k, the direction input button 20a, the operation button 20b, the operation button 20c, the operation button 20d, the operation button 20e, the power button 20f, the start button 20g, and the select button 20h are provided on the surface (inward surface) to which the second LCD 18 of the lower housing 14 is set. More specifically, the direction input button 20a and the power button 20f are arranged at the left of the second LCD 18, and the operation buttons 20b-20e, 20g and 20h are arranged at the right of the second LCD 18. Furthermore, when the upper housing 12 and the lower housing 14 are folded, the operation buttons 20a-20h are enclosed within the game apparatus 10.

The direction input button (cross key) 20a functions as a digital joystick, and is used for instructing a moving direction of a player object, moving a cursor, and so forth. Each operation buttons 20b-20e is a push button, and is used for causing the player object to make an arbitrary action, executing a decision and cancellation, and so forth. The power button 20f is a push button, and is used for turning on or off the main power supply of the game apparatus 10. The start button 20g is a push button, and is used for temporarily stopping (pausing), starting (restarting) a game, and so forth. The select button 20h is a push button, and is used for a game mode selection, a menu selection, etc.

Although operation buttons 20i-20k are omitted in FIG. 1, as shown in FIG. 2(A), the operation button (L button) 20i is provided at the left corner of the upper side surface of the lower housing 14, and the operation button (R button) 20j is provided at the right corner of the upper side surface of the lower housing 14. Furthermore, as shown in FIG. 2(B), the volume button 20k is provided on the left side surface of the lower housing 14.

FIG. 2(A) is an illustrative view of the game apparatus 10 in a folded manner as seen from a top surface (upper housing 12). FIG. 2(B) is an illustrative view of the game apparatus 10 in a folded manner when seen from a left side surface.

The L button 20i and the R button 20j are push buttons, and can be used for similar operations to those of the operation buttons 20b-20e, and can be used as subsidiary operations of these operation buttons 20b-20e. Furthermore, in this embodiment, the L button 20i and the R button 20j can be also used for an operation of a imaging instruction (shutter operation). The volume button 20k is made up of two push buttons, and is utilized for adjusting the volume of the sound output from two speakers (right speaker and left speaker) not shown. In this embodiment, the volume button 20k is provided with an operating portion including two push portions, and the aforementioned push buttons are provided by being brought into correspondence with the respective push portions. Thus, when the one push portion is pushed, the volume is made high, and when the other push portion is pushed, the volume is made low. For example, when the push portion is hold down, the volume is gradually made high, or the volume is gradually made low.

Returning to FIG. 1, the game apparatus 10 is provided with a touch panel 22 as an input device separate from the operation buttons 20a-20k. The touch panel 22 is attached so as to cover the screen of the second LCD 18. In this embodiment, a touch panel of a resistance film system is used as the touch panel 22, for example. However, the touch panel 22 can employ an arbitrary push-type touch panel without being restricted to the resistance film system. Furthermore, in this embodiment, as the touch panel 22, a touch panel having the same resolution (detection accuracy) as the resolution of the second LCD 18, for example, is utilized. However, the resolution of the touch panel 22 and the resolution of the second LCD 18 are not necessarily coincident with each other.

Additionally, at the right side surface of the lower housing 14, a loading slot (represented by a dashed line shown in FIG. 1) is provided. The loading slot can house a touch pen 24 to be utilized for performing an operation on the touch panel 22. Generally, an input with respect to the touch panel 22 is performed with the touch pen 24, but it may be performed with a finger of the user beyond the touch pen 24. Accordingly, in a case that the touch pen 24 is not to be utilized, the loading slot and the housing portion for the touch pen 24 need not to be provided.

Moreover, on the right side surface of the lower housing 14, a loading slot for housing a memory card 26 (represented by a chain double-dashed line in FIG. 1) is provided. Inside of the loading slot, a connector (not illustrated) for electrically connecting the game apparatus 10 and the memory card 26 is provided. The memory card 26 is an SD card, for example, and detachably attached to the connector. This memory card 26 is used for storing (saving) an image imaged by the game apparatus 10, and reading the image generated (imaged) or stored by another apparatus in the game apparatus 10.

In addition, on the upper side surface of the lower housing 14, a loading slot (represented by an alternate long and short dash line FIG. 1) for housing a memory card 28 is provided. Inside the loading slot, a connector (not illustrated) for electrically connecting the game apparatus 10 and the memory card 28 is also provided. The memory card 28 is a recording medium of recording an information processing program, necessary data, etc. and is detachably attached to the loading slot provided to the lower housing 14.

At the left end of the connected portion (hinge) between the upper housing 12 and the lower housing 14, an indicator 30 is provided. The indicator 30 is made up of three LEDs 30a, 30b, 30c. Here, the game apparatus 10 can make a wireless communication with another appliance, and the first LED 30a lights up when a wireless communication with the appliance is established. The second LED 30b lights up while the game apparatus 10 is recharged. The third LED 30c lights up when the main power supply of the game apparatus 10 is turned on. Thus, by the indicator 30 (LEDs 30a-30c), it is possible to inform the user of a communication-established state, a charge state, and a main power supply on/off state of the game apparatus 10.

As described above, the upper housing 12 is provided with the first LCD 16. In this embodiment, the touch panel 22 is set so as to cover the second LCD 18, but the touch panel 22 may be set so as to cover the first LCD 16. Alternatively, two touch panels 22 may be set so as to cover the first LCD 16 and the second LCD 18. For example, on the first LCD 16, an operation explanatory screen for teaching the user how the respective operation buttons 20a-20k and the touch panel 22 work or how to operate them, and a game screen are displayed.

Additionally, the upper housing 12 is provided with the two cameras (inward camera 32 and outward camera 34). As shown in FIG. 1, the inward camera 32 is attached in the vicinity of the connected portion between the upper housing 12 and the lower housing 14 and on the surface to which the first LCD 16 is provided such that the display surface of the first LCD 16 and the imaging surface are in parallel with each other or are leveled off. On the other hand, the outward camera 34 is attached to the surface being opposed to the surface to which the inward camera 32 is provided as shown in FIG. 2(A), that is, on the outer surface of the upper housing 12 (the surface turns to the outside when the game apparatus 10 is in a close state, and on the back surface of the upper housing 12 shown in FIG. 1). Here, in FIG. 1, the outward camera 34 is shown by a dashed line.

Accordingly, the inward camera 32 can image a direction to which the inner surface of the upper housing 12 is turned, and the outward camera 34 can image a direction opposite to the imaging direction of the inward camera 32, that is, can image a direction to which the outer surface of the upper housing 12 is turned. Thus, in this embodiment, the two cameras 32, 34 are provided such that the imaging directions of the inward camera 32 and the outward camera 34 are the opposite direction with each other. For example, the user holding the game apparatus 10 can image a landscape (including the user, for example) as the user is seen from the game apparatus 10 with the inward camera 32, and can image a landscape and other user as the direction opposite to the user is seen from the game apparatus 10 with the outward camera 34.

Additionally, on the internal surface near the aforementioned connected portion, a microphone 84 (see FIG. 3) is housed as a voice input device. Then, on the internal surface near the aforementioned connected portion, a through hole 36 for the microphone 84 is formed so as to detect a sound outside the game apparatus 10. The position for housing the microphone 84 and the position of the through hole 36 for the microphone 84 are not necessarily on the aforementioned connected portion, and the microphone 84 may be housed in the lower housing 14, and the through hole 36 for the microphone 84 may be provided to the lower housing 14 in correspondence with the housing position of the microphone 84.

Furthermore, on the outer surface of the upper housing 12, in the vicinity of the outward camera 34, a fourth LED 38 (dashed line in FIG. 1) is attached. The fourth LED 38 lights up at a time when an imaging is made with the inward camera 32 or the outward camera 34 (shutter button is pushed). Furthermore, in a case that a motion image is imaged with the inward camera 32 or the outward camera 34, the fourth LED 38 continues to light up during the imaging. That is, by making the fourth LED 38 light up, it is possible to inform an object to be imaged or his or her surrounding that an imaging with the game apparatus 10 is made (is being made).

Moreover, the upper housing 12 is formed with a sound release hole 40 on both sides of the first LCD 16. The above-described speaker is housed at a position corresponding to the sound release hole 40 inside the upper housing 12.

The sound release hole 40 is a through hole for releasing the sound from the speaker to the outside of the game apparatus 10.

As described above, the upper housing 12 is provided with the inward camera 32 and the outward camera 34 which are constituted to image an image and the first LCD 16 as a displayer for mainly displaying the imaged image and a game screen. On the other hand, the lower housing 14 is provided with the input device (operation button 20 (20a-20k) and the touch panel 22) for performing an operation input to the game apparatus 10 and the second LCD 18 as a displayer for mainly displaying an operation explanatory screen and a game screen. Accordingly, the game apparatus 10 has two screens (16, 18) and two kinds of operating portions (20, 22).

Figure 3:
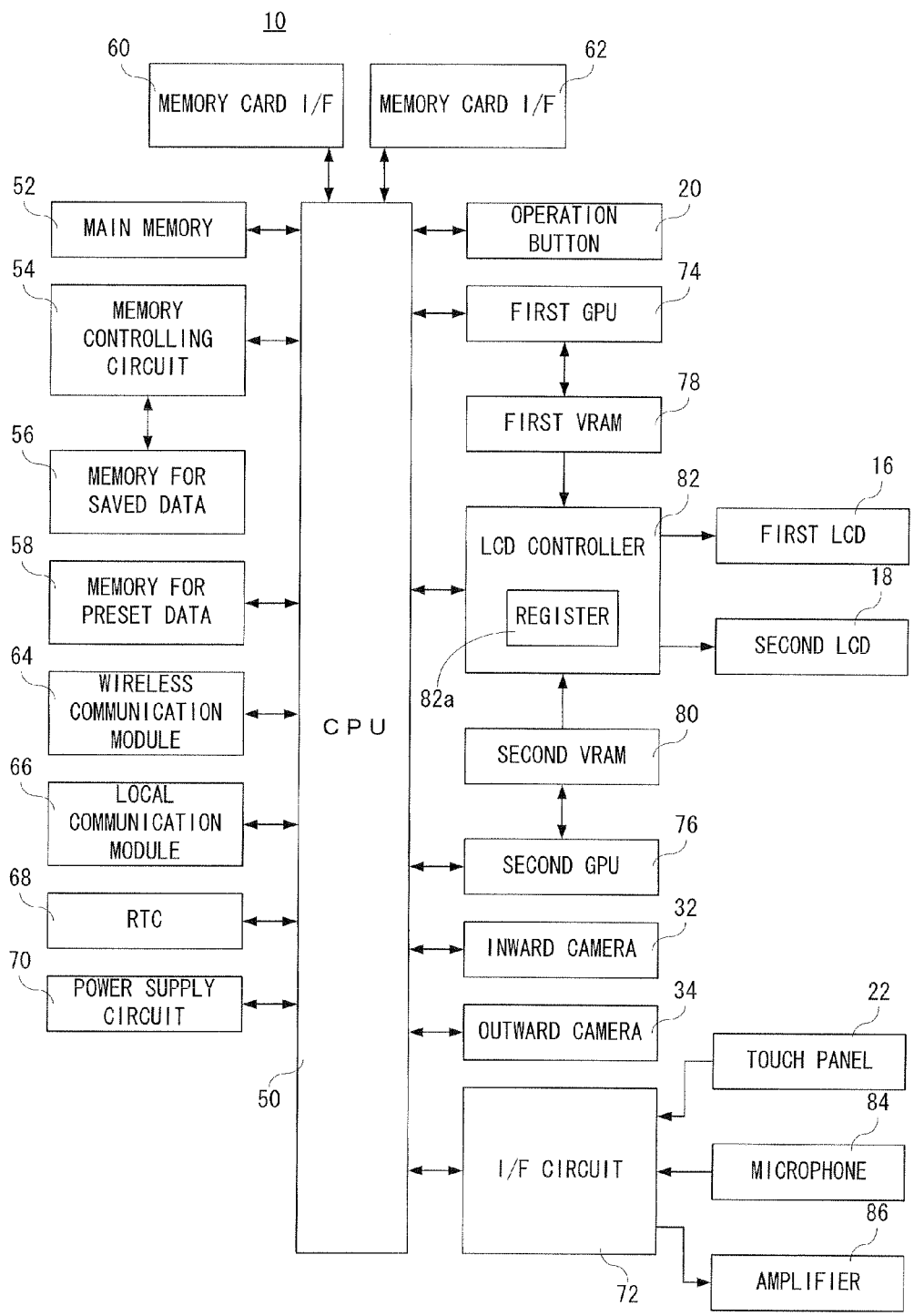
FIG. 3 is a block diagram showing an electric configuration of the game apparatus shown in FIG. 1.

FIG. 3 is a block diagram showing an electric configuration of the game apparatus 10 of this embodiment. As shown in FIG. 3, the game apparatus 10 includes electronic components, such as a CPU 50, a main memory 52, a memory controlling circuit 54, a memory for saved data 56, a memory for preset data 58, a memory card interface (memory card I/F) 60, a memory card I/F 62, a wireless communication module 64, a local communication module 66, a real-time clock (RTC) 68, a power supply circuit 70, and an interface circuit (I/F circuit) 72, a first GPU (Graphics Processing Unit) 74, a second GPU 76, a first VRAM (Video RAM) 78, a second VRAM 80, an LCD controller 82, etc. These electronic components (circuit components) are mounted on an electronic circuit board, and housed in the lower housing 14 (or the upper housing 12 may also be appropriate).

The CPU 50 is an information processing means for executing a predetermined program. In this embodiment, the predetermined program is stored in a memory (memory for saved data 56, for example) within the game apparatus 10 and the memory card 26 and/or 28, and the CPU 50 executes information processing described later by executing the predetermined program.

Here, the program to be executed by the CPU 50 may be previously stored in the memory within the game apparatus 10, acquired from the memory card 26 and/or 28, and acquired from another appliance by communicating with this another appliance.

The CPU 50 is connected with the main memory 52, the memory controlling circuit 54, and the memory for preset data 58. The memory controlling circuit 54 is connected with the memory for saved data 56. The main memory 52 is a memory means to be utilized as a work area and a buffer area of the CPU 50. That is, the main memory 52 stores (temporarily stores) various data to be utilized in the aforementioned information processing, and stores a program from the outside (memory cards 26 and 28, and another appliance). In this embodiment, as a main memory 52, a PSRAM (Pseudo-SRAM) is used, for example. The memory for saved data 56 is a memory means for storing (saving) a program to be executed by the CPU 50, data of an image imaged by the inward camera 32 and the outward camera 34, etc. The memory for saved data 56 is constructed by a nonvolatile storage medium, and can utilize a NAND type flash memory, for example. The memory controlling circuit 54 controls reading and writing from and to the memory for saved data 56 according to an instruction from the CPU 50. The memory for preset data 58 is a memory means for storing data (preset data), such as various parameters, etc. which are previously set in the game apparatus 10. As a memory for preset data 58, a flash memory to be connected to the CPU 50 through an SPI (Serial Peripheral Interface) bus can be used.

Both of the memory card I/Fs 60 and 62 are connected to the CPU 50. The memory card I/F 60 performs reading and writing data from and to the memory card 26 attached to the connector according to an instruction form the CPU 50. Furthermore, the memory card I/F 62 performs reading and writing data from and to the memory card 28 attached to the connector according to an instruction form the CPU 50. In this embodiment, image data corresponding to the image imaged by the inward camera 32 and the outward camera 34 and image data received by other devices are written to the memory card 26, and the image data stored in the memory card 26 is read from the memory card 26 and stored in the memory for saved data 56, and sent to other devices. Furthermore, the various programs stored in the memory card 28 is read by the CPU 50 so as to be executed.

Here, the information processing program such as a game program is not only supplied to the game apparatus 10 through the external storage medium, such as a memory card 28, etc. but also is supplied to the game apparatus 10 through a wired or a wireless communication line. In addition, the information processing program may be recorded in advance in a nonvolatile storage device inside the game apparatus 10. Additionally, as an information storage medium for storing the information processing program, an optical disk storage medium, such as a CD-ROM, a DVD or the like may be appropriate beyond the aforementioned nonvolatile storage device.

The wireless communication module 64 has a function of connecting to a wireless LAN according to an IEEE802.11.b/g standard-based system, for example. The local communication module 66 has a function of performing a wireless communication with the same types of the game apparatuses by a predetermined communication system. The wireless communication module 64 and the local communication module 66 are connected to the CPU 50. The CPU 50 can receive and send data over the Internet with other appliances by means of the wireless communication module 64, and can receive and send data with the same types of other game apparatuses by means of the local communication module 66.

Furthermore, the CPU 50 is connected with the RTC 68 and the power supply circuit 70. The RTC 68 counts a time to output the same to the CPU 50. For example, the CPU 50 can calculate a date and a current time, etc. on the basis of the time counted by the RTC 68. The power supply circuit 70 controls power supplied from the power supply (typically, a battery accommodated in the lower housing 14) included in the game apparatus 10, and supplies the power to the respective circuit components within the game apparatus 10.

Also, the game apparatus 10 includes the microphone 84 and an amplifier 86. Both of the microphone 84 and the amplifier 86 are connected to the I/F circuit 72. The microphone 84 detects a voice and a sound (clap and handclap, etc.) of the user produced or generated toward the game apparatus 10, and outputs a sound signal indicating the voice or the sound to the I/F circuit 72. The amplifier 86 amplifies the sound signal applied from the I/F circuit 72, and applies the amplified signal to the speaker (not illustrated). The I/F circuit 72 is connected to the CPU 50.

The touch panel 22 is connected to the I/F circuit 72. The I/F circuit 72 includes a sound controlling circuit for controlling the microphone 84 and the amplifier 86 (speaker), and a touch panel controlling circuit for controlling the touch panel 22. The sound controlling circuit performs an A/D conversion and a D/A conversion on a sound signal, or converts a sound signal into sound data in a predetermined format. The touch panel controlling circuit generates touch position data in a predetermined format on the basis of a signal from the touch panel 22 and outputs the same to the CPU 50. For example, touch position data is data indicating coordinates of a position where an input is performed on an input surface of the touch panel 22.

Additionally, the touch panel controlling circuit performs reading of a signal from the touch panel 22 and generation of the touch position data per each predetermined time. By fetching the touch position data via the I/F circuit 72, the CPU 50 can know the position on the touch panel 22 where the input is made.

The operation button 20 is made up of the aforementioned respective operation buttons 20a-20k, and connected to the CPU 50. The operation data indicating a input state (whether or not to be pushed) with respect to each of the operation buttons 20a-20k is output from the operation button 20 to the CPU 50. The CPU 50 acquires the operation data from the operation button 20, and executes processing according to the acquired operation data.

Both of the inward camera 32 and the outward camera 34 are connected to the CPU 50. The inward camera 32 and the outward camera 34 image images according to instructions from the CPU 50, and output image data corresponding to the imaged images to the CPU 50. In this embodiment, the CPU 50 issues an imaging instruction to any one of the inward camera 32 and the outward camera 34 while the camera (32, 34) which has received the imaging instruction images an image and sends the image data to the CPU 50.

The first GPU 74 is connected with the first VRAM 78, and the second GPU 76 is connected with the second VRAM 80. The first GPU 74 generates a first display image on the basis of data for generating the display image stored in the main memory 52 according to an instruction from the CPU 50, and draws the same in the first VRAM 78. The second GPU 76 similarly generates a second display image according to an instruction form the CPU 50, and draws the same in the second VRAM 80. The first VRAM 78 and the second VRAM 80 are connected to the LCD controller 82.

The LCD controller 82 includes a register 82a. The register 82a stores a value of "0" or "1" according to an instruction from the CPU 50. In a case that the value of the register 82a is "0", the LCD controller 82 outputs the first display image drawn in the first VRAM 78 to the second LCD 18, and outputs the second display image drawn in the second VRAM 80 to the first LCD 16. Furthermore, in a case that the value of the register 82a is "1", the LCD controller 82 outputs the first display image drawn in the first VRAM 78 to the first LCD 16, and outputs the second display image drawn in the second VRAM 80 to the second LCD 18.

Figure 4:
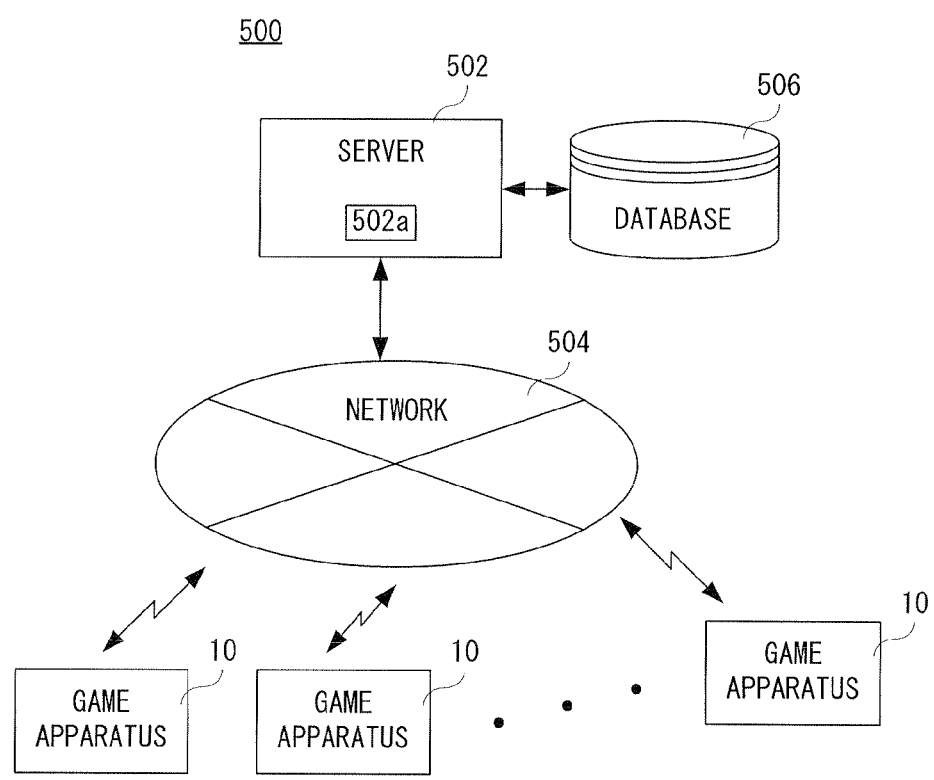
FIG. 4 is an illustrative view showing one example of a network system utilizing the game apparatus shown in FIG. 1.

FIG. 4 is an illustrative view showing an example of a network system 500 by utilizing the game apparatus 10 shown in FIG. 1 to FIG. 3. As shown in FIG. 4, the network system 500 includes a server 502, and the server 502 is communicatably connected with a plurality of the game apparatuses 10 via a network 504, such as the Internet or a LAN. Furthermore, the server 502 is directly connected with a database 506. Here, the database 506 may be connected to the server 502 via the network 504. The server 502 is a general-purpose server, and includes a component such as a CPU 502a, etc. Here, the game apparatus 10 can directly communicate with another game apparatus 10.

For example, the user creates a message to be transmitted to a user of another game apparatus 10 by utilizing his or her own game apparatus 10, and transmits (uploads) message data corresponding to the created message to the server 502. Furthermore, the user accesses the server 502 by utilizing his or her own game apparatus 10, inquires whether or not there is a message addressed to the player himself or herself, and receives (downloads) message data corresponding to a message in a case that there is a message addressed to the player.

The game apparatus 10 manages the number of transmissions of the message data transmitted to other game apparatuses 10 and the number of receptions of the message data received from other game apparatuses 10 for each game apparatus 10 (of the user), and represents the degree of friendship (strength of the friendship) between the user himself or herself and the user of the other game apparatuses 10 depending on the number of transmissions and the number of receptions. Here, the favor from the user himself or herself of the game apparatus 10 to the user of another game apparatus 10 and the favor from the user of this another game apparatus 10 to the user himself or herself of the game apparatus 10 are identifiably represented.

Hereinafter, in the specification, the user of his or her own game apparatus 10 is referred to as a "first user", and the user of another game apparatus 10 registered as a communication object (communication partner) with the user's game apparatus 10 is referred to as a "second user".

Figure 5:
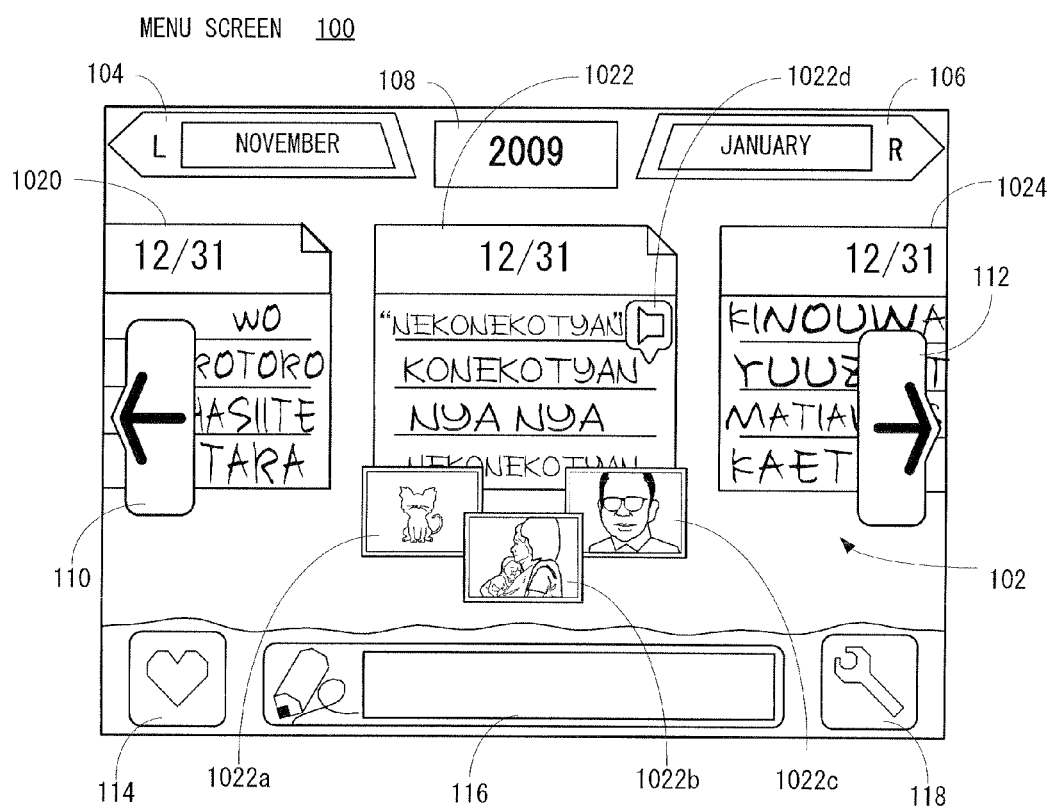
FIG. 5 is an illustrative view showing one example of a menu screen to be displayed on a second LCD of the game apparatus shown in FIG. 1.

More specifically, when the information processing of this embodiment is started, a menu screen 100 shown in FIG. 5 is displayed on the second LCD 18. At the center of the menu screen 100, a display area 102 for a message according to the message data of this embodiment is provided. On the menu screen 100 shown in FIG. 5, three messages 1020, 1022, 1024 are displayed in the display area 102. Although illustration is omitted, if no message data is stored (created and received), a message is not displayed on the display area 102. Alternatively, a message indicating that there is no message to be displayed is displayed.

In this embodiment, the message includes at least one of a character, design, a photograph and voice. Here, the character includes pictorial symbols, symbols, signs, numerals as well as hiragana characters, katakana characters, kanji characters, Roman characters and numeric characters (Arabic numerals, etc.). Furthermore, in place of the characters, images (pictures and designs, etc.) may be drawn, and both of the characters and images may be drawn. In addition, in this embodiment, since transmission to other game apparatuses 10 and reception from other game apparatuses 10 are preconditions, the term of "message" is used, but if transmissions to other game apparatuses 10 are not performed, the created "message" corresponds to "memo" and "diary".

On the menu screen 100 shown in FIG. 5, on the message 1020, 1024, handwritten characters are described. Furthermore, on the message 1022, a handwritten character is described, and three sheets of photographs and voice are further attached. In a case that a photograph is attached, a thumbnail image of the photograph is displayed so as to be overlapped with the handwritten characters or near the handwritten characters. Here, the data of the photographs (photograph data) is an image (imaged image) imaged by the cameras 32, 34 of the game apparatus 10 (imaged image) or an image captured from the memory card 26, such as an SD card attached to the game apparatus 10. Here, photograph data included in the received message data is an imaged mage imaged by the cameras 32, 34 of other game apparatus 10 registered as a communication object or an image captured from the memory card 26 attached to the other game apparatus 10 registered as a communication object. On the menu screen 100 shown in FIG. 5, thumbnail images 1022a, 1022*b*, 1022*c* are displayed. Furthermore, in a case that a voice is attached, a button image representing a voice (speaker) is displayed so as to be overlapped with the handwritten character. On the menu screen 100 shown in FIG. 5, a button image 1022*d* is displayed.

Although illustration is omitted, when the thumbnail images 1022*a*, 1022*b*, 1022*c* are designated (touched), a corresponding image is displayed on the first LCD 16. Furthermore, when the button image 1022*d* as to the voice is designated (touched), a corresponding voice is output from the speaker.

Additionally, as shown in FIG. 5, on the menu screen 100, above the display area 102 for the message, a button image 104 and a button image 106 are displayed, and a display area 108 is provided between the button image 104 and the button image 106. The button image 104 is used for displaying a message of the previous month in the display area 102. Here, in place of the button image 104 being designated (touched), the L button 20*i* may be operated (turned on). The button image 106 is used for displaying a message of a next month in the display area 102. Here, in place of the button image 106 being touched, the R button 20*j* may be turned on. In the display area 108, years of the Christian era are displayed.

In addition, as shown in FIG. 5, at both ends of the display area 102, a button image 110 and a button image 112 are displayed. The button image 110 is used for moving the message (1020-1024, etc.) displayed in the display area 102 to the right direction, and displaying the message existing at the left of the message 1020 in the display area 102. Furthermore, the button image 112 is used for moving the message (1020-1024, etc.) displayed in the display area 102 to the left direction, and displaying a message existing at the right of the message 1024 to the display area 102. That is, in response to the button image 110 or the button image 112 being turned on, the message (1020-1024, etc.) created and, transmitted and received in this month is selectively displayed in the display area 102. Here, if there are less than three messages that are created and, transmitted and received in this month, even if the button image 110 and the button image 112 are turned on, the message is not moved. Alternatively, in such a case, the button image 110 and the button image 112 are displayed to be grayed out and disabled.

In addition, as shown in FIG. 5, on the menu screen 100, below the display area 102 for the messages, the button image 114, the button image 116, and the button image 118 are displayed. The button image 114 is used for displaying a screen for indicating a relationship between the first user and one or a plurality of second users ("strength of the friendship" in this embodiment) (relationship diagram displaying screen 300 described later (see FIG. 7)). The button image 116 is used for creating a novel message (message data). The button image 118 is used for deleting a message (message data), group editing as to the second user, deciding whether or not the message data can be moved to the memory card 26, and setting whether or not the message data is to be transferred and an edition is performed.

Figure 6:
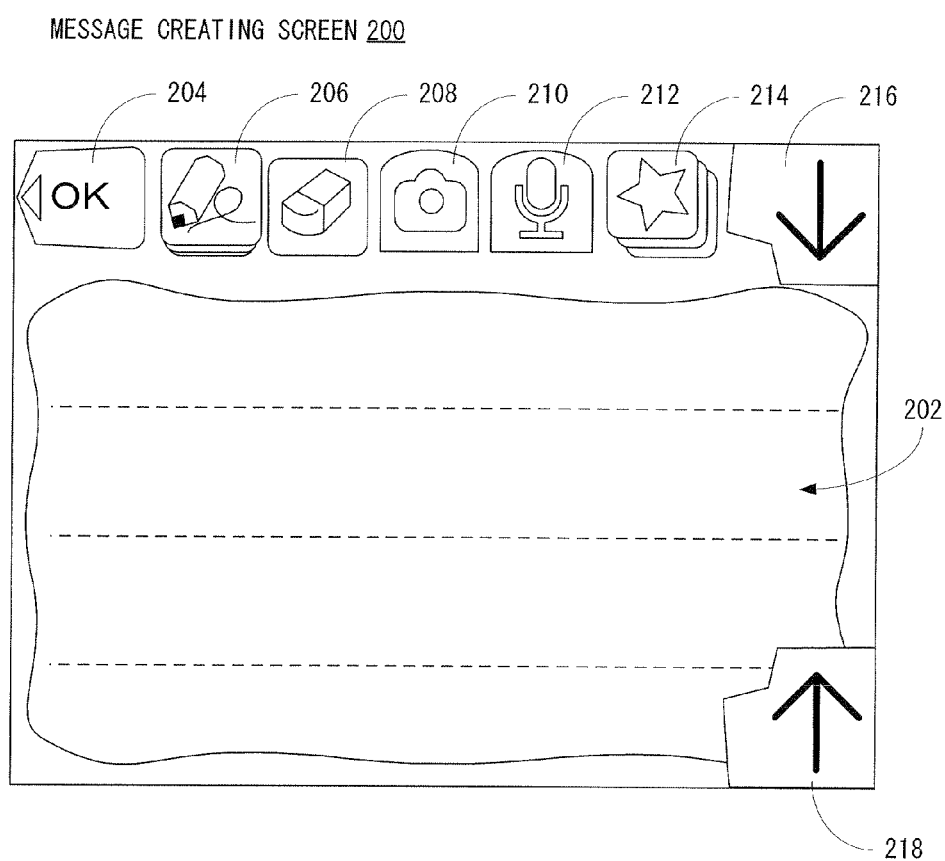
FIG. 6 is an illustrative view showing one example of a message creating screen to be displayed on the second LCD of the game apparatus shown in FIG. 1.

When the button image 116 is turned on on the menu screen 100 shown in FIG. 5, a message creating screen 200 shown in FIG. 6 is displayed on the second LCD 18. On the message creating screen 200 shown in FIG. 6, a drawing area (input region) 202 for drawing (inputting) a handwritten character and an image (hereinafter referred to as "character or the like") is provided. For example, the user can draw the character or the like in the drawing area 202 by utilizing the touch pen 24.

Furthermore, on the message creating screen 200, above the drawing area 202, a button image 204, a button image 206, a button image 208, a button image 210, a button image 212, a button image 214 and a button image 216 are displayed. In addition, at a lower right corner of the message creating screen 200 (drawing area 202), a button image 218 is displayed.

The button image 204 is used for storing message data corresponding to the created message in the memory card 26, the main memory 52, or the memory for saved data 56. The button image 206 is used for selecting a mode to draw the character or the like in the drawing area 202. The button image 208 is used for selecting a mode to erase the character or the like drawn in the drawing area 202. That is, in a case that the button image 206 is turned on, when the first user makes an operation with the touch pen 24 pressed on the drawing area 202, the character or the like is drawn, but in a case that the button image 208 is turned on, the first user traces the character or the like drawn in the drawing area 202 with the touch pen 24, a part traced with the touch pen 24 out of the drawn character or the like is erased.

Furthermore, the button image 210 is used for making a transition to a picture-taking mode (imaging processing) in a case that a photograph is included in the message which is being created. When the button image 210 is turned on, a transition to the picture-taking mode is made to start the outward camera 34 (or, inward camera 32). At this time, the first LCD 16 (or the second LCD 18) functions as a viewfinder to display a through image captured by the outward camera 34. Then, when the user turns the shutter button (L button 20*i* or R button 20*j*) on, imaged image data corresponding to a still image (imaged image) when the shutter button is turned on is stored in the memory card 26, the main memory 52, or the memory for saved data 56 in association with the handwritten character or the like.

It should be noted that the resolution of the outward camera 34 is set to the same or approximately the same as that of the first LCD 16.

In addition, the button image 212 is used for making a transition to a recording mode (recording processing) in a case that a voice is included in the message which is being created. When the button image 212 is turned on, a transition to the recording mode is made to make an input from the microphone 84 valid. Accordingly, when the first user inputs a voice through the microphone 84, corresponding audio data is stored by being associated with the data of the handwritten character or the like in the memory card 26, the main memory 52, or the memory for saved data 56.

Here, in order to prevent an amount of data from being enormous, the first user can inputs a voice up to maximum of 20 seconds.

In addition, the button image 214 is used for setting options as to the message (message data) which is being created. The option is not essential content of the present application, and is a matter arbitrarily decided by developers and programmers, and therefore, detailed explanation is omitted here.

The button image 216 is used for scrolling down. Thus, when the button image 216 is turned on, the displayed content of the drawing area 202 is moved upward to thereby display a next page. Furthermore, the button image 218 is used for scrolling up. Thus, when the button image 218 is turned on, a displayed content of the drawing area 202 moves downward to display a previous page. That is, the first user confirms the content drawn on the previous page, and displays a next page to drawn the character or the like by turning the button image 216 and the button image 218 on.

Figure 7:
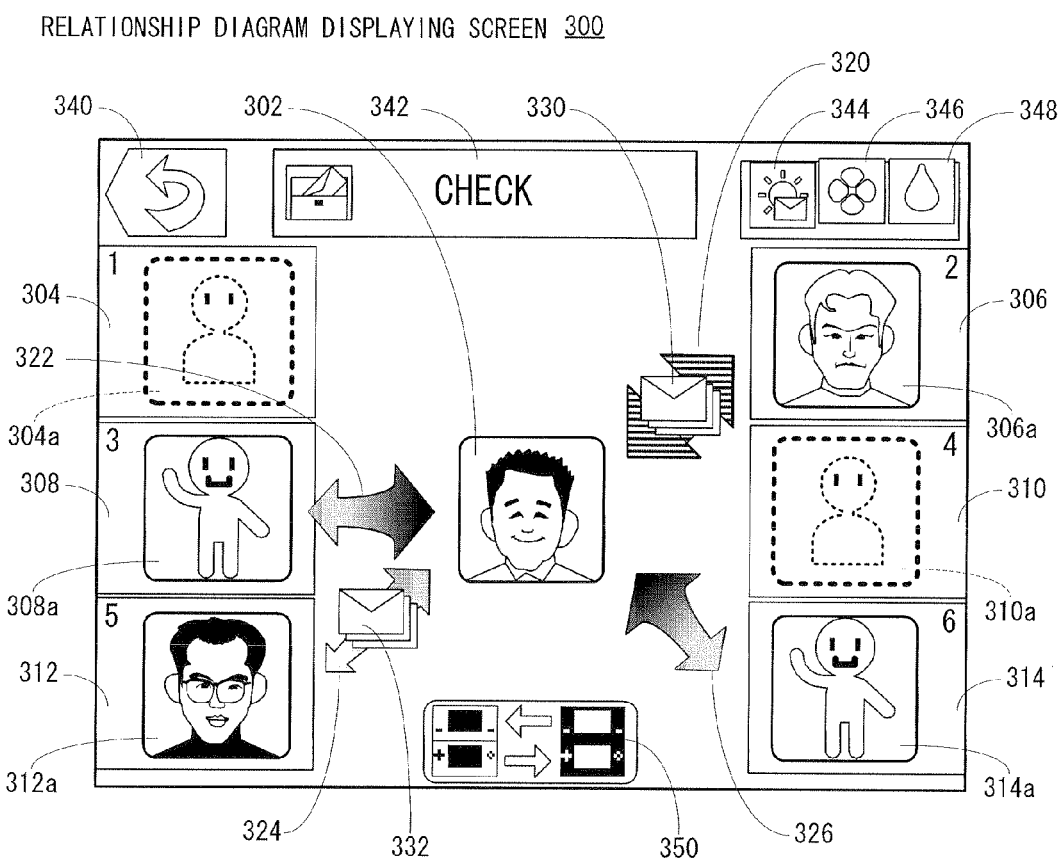
FIG. 7 is an illustrative view showing one example of a relationship diagram displaying screen to be displayed on the second LCD of the game apparatus shown in FIG. 1.

Additionally, when the button image 114 is turned on on the menu screen 100 shown in FIG. 5, a relationship diagram displaying screen 300 as shown in FIG. 7 is displayed on the second LCD 18. On the relationship diagram displaying screen 300, an image (user image) 302 as to the first user is displayed at approximately the center thereof. The user image 302 (this is true for user images 306a, 308a, 312a, 314a) is his or her own image registered by the first user (facial image in this embodiment) or an image (avatar) stored in advance in the memory (memory card 26, memory card 28, main memory 52, or memory for saved data 56) of the game apparatus 10. Although detailed description is omitted, the user image 302 is set when the first user registers his or her own profile in the server 502. This holds true for the other user images 306a, 308a, 312a, 314a, and the user image is set when the second user registers his or her own profile in the server 502.

On the relationship diagram displaying screen 300, display areas 304, 308, 312 for displaying user images of the second users are provided at the left of the user image of the first user 302, and display areas 306, 310, 314 for displaying user images of the second users are provided at the right of the user image 302. In the example of the relationship diagram displaying screen 300 shown in FIG. 7, user images of the second users 306a, 308a, 312a and 314a are displayed in the display areas 306, 308, 312 and 314, respectively. Although detailed description is omitted, when the second user is registered, a position for displaying the user image (306a, 308a, 312a, 314a) of the second user is decided by the first user. Furthermore, in the display areas 304 and 310, the second user is not registered, and therefore, an image (unregistered image) 304a, 310a showing that the second user has not yet been registered is displayed.

In addition, on the relationship diagram displaying screen 300 shown in FIG. 7, an arrow (320, 322, 324, 326) is displayed between the user image of the first user 302 and the user image of each of the second users (306a, 308a, 312a, 314a). More specifically, the arrow 320 is displayed between the user image 302 and the user image 306a. Additionally, the arrow 322 is displayed between the user image 302 and the user image 308a. In addition, the arrow 324 is displayed between the user image 302 and the user image 312a. Moreover, the arrow 326 is displayed between the user image 302 and the user image 314a.

Here, a display manner of the arrow (320-326) displayed between the user image of the first user 302 and the user image of each of the second users (306a, 308a, 312a, 314a) is changed depending on the degree of transmission and the degree of reception of messages (message data) between the first user and the second user. It should be noted that the degree of transmission is the degree of transmission of messages transmitted by the game apparatus 10 of the first user to the game apparatus 10 of the second user, and the degree of reception is the degree of reception of the messages received by the game apparatus 10 of the first user from the game apparatus 10 of the second user. More specifically, the degree of transmission is the number of transmissions of the messages (message data), and the degree of reception is the number of receptions of the messages (message data).

In the example shown in FIG. 8(A)-FIG. 8(D), a design of the user image, and a thickness and a color of the arrow are changed based on the number of transmissions of messages transmitted by the first user to the second user and the number of receptions of the message received by the first user from the second user. Here, as understood from FIG. 8(A)-FIG. 8(D), between the user image of the first user and the user image of the second user, one arrow designating a two way direction is displayed, and if the thick of the arrow and the color of the arrow are differentiated, the thickness and the color are represented so as to be gradually changed.

It should be noted that in FIG. 8(A)-FIG. 8(D), for simplicity, the user image represents a facial image imitating a face of the person.

In this embodiment, the thickness of the arrow is classified into 3 kinds ("thick", "middle", and "thin"). Furthermore, in this embodiment, the color of the arrow is classified into 3 kinds ("red", "orange", and "yellow"). However, the drawings cannot be represented by colors and thus represented by monochrome. More specifically, "red" is represented by "black", "orange" is represented by "gray", and "yellow" is represented by "white".

Here, an arrow setting method is explained. In a case that the number of transmissions of messages transmitted by the first user to the second user is equal to or less than 10, the thickness of the arrow is set to "thin" on the side of the user image of the second user. Furthermore, in this case, the color of the arrow is set to "yellow" on the side of the user image of the second user.

Furthermore, in a case that the number of transmissions of messages transmitted by the first user to the second user is equal to or more than 11 and equal to or less than 30, the thickness of the arrow is set to "middle" on the side of the user image of the second user. Additionally, in this case, the color of the arrow is set to "orange" on the side of the user image of the second user.

In addition, in a case that the number of transmissions of messages transmitted by the first user to the second user is equal to or more than 31, and the transmitting time (latest transmitting time) when a message is transmitted to the second user last is within one week from the current time, the thickness of the arrow is set to "thick" on the side of the user image of the second user. Furthermore, in this case, the color of the arrow is set to "red" on the side of the user image of the second user.

In a case that the number of receptions of the messages which the first user receives from the second user is equal to or less than 10, the thickness of the arrow is set to "thin" on the side of the user image of the first user. In addition, in this case, the color of the arrow is set to "yellow" on the side of the user image of the first user.

Furthermore, in a case that the number of receptions of the messages which the first user receives from the second user is equal to or more than 11 and equal to or less than 30, the thickness of the arrow is set to "middle" on the side of the user image of the first user. Furthermore, in this case, the color of the arrow is set to "orange" on the side of the user image of the first user.

In addition, in a case that the number of receptions of the messages which the first user receives from the second user is equal to or more than 31, and the receiving time when a message is received from the second user last (latest receiving time) is within one week from the current time, the thickness of the arrow is set to "thick" on the side of the user image of the first user. In this case, the color of the arrow is set to "red" on the side of the user image of the first user.

Here, in this embodiment, in a case that both of the degree of transmission and the degree of reception satisfy a predetermined condition, the arrow is displayed in a specific manner. Furthermore, the user image is generally a design (normal design) decided when the first user or the second user registers the profile, but in a case that both of the degree of transmission and the degree of reception satisfy a predetermined condition, the user image is also displayed in the specific manner.

In this embodiment, that the degree of transmission satisfies the predetermined condition is a case that a condition that the thickness of the arrow is "thick" and the color is set to "red" on the side of the user image of the second user is satisfied as described above, that is, the number of transmissions of messages transmitted from the first user to the second user is equal to or more than 31, and the transmitting time of the message transmitted to the second user last (latest transmitting time) is within one week from the current time. In addition, that the degree of reception satisfies the predetermined condition is a case that a condition that the thickness of the arrow is "thick" and the color is set to "red" on the side of the user image of the first user is satisfied as described above, that is, the number of receptions of the messages received by the first user from the second user is equal to or more than 31, and the receiving time when the message is received last from the second user (latest receiving time) is within one week from the current time. In a case that both of the degree of transmission and the degree of reception satisfy the predetermined conditions, 31 or more messages are transmitted and received between the first user and the second user, and the latest transmission by the first user to the second user and the latest reception by the first user from the second user are performed within one week, and it can be said that the strength of the friendship between the first user and the second user is high.

For example, as shown in FIG. 8(A), in a case that the number of transmissions of messages transmitted from the first user to the second user is equal to or less than 10, and the number of receptions of messages received by the first user from the second user is equal to or less than 10, the user image of the first user and the user image of the second user are displayed by the normal design. In this case, the thickness of the arrow is set to "thin" on the side of the user image of the first user and on the side of the user image of the second user. Furthermore, the color of the arrow is set to "yellow" on both sides of the user images.

Furthermore, as shown in FIG. 8(B), in a case that the number of transmissions of messages transmitted by the first user to the second user is equal to or more than 11 and equal to or less than 30, and the number of receptions of messages received by the first user from the second user is equal to or less than 10, both of the user image of the first user and the user image of the second user are displayed by the normal design. In this case, the thickness of the arrow is set to "middle" on the side of the user image of the second user, and the thickness of the arrow is set to "thin" on the side of the user image of the first user. At this time, the color of the arrow is set to "orange" on the side of the user image of the second user and is set to "yellow" on the side of the user image of the first user. In this embodiment, as understood from FIG. 8(B), the thickness of the arrow and the color of the arrow are different on both sides of the arrow, and the thickness and the color of the arrow are smoothly changed. This holds true hereunder.

In addition, as shown in FIG. 8(C), in a case that the number of transmissions of messages transmitted by the first user to the second user is equal to or more than 31 and the transmitting time of the message which is transmitted last is within one week from the current time, and the number of receptions of messages received by the first user from the second user is equal to or more than 31 but the receiving time of the message which is received last is not within one week from the current time, both of the user image of the first user and the user image of the second user are displayed by the normal design. In this case, the thickness of the arrow is set to "thick" on the side of the user image of the second user, and the thickness of the arrow is set to "middle" on the side of the user image of the first user. At this time, the color of the arrow is set to "red" on the side of the user image of the second user and is set to "orange" on the side of the user image of the first user.

In addition, as shown in FIG. 8(D), in a case that the degree of transmission of messages transmitted by the first user to the second user satisfies the predetermined condition, and the degree of reception of messages received by the first user from the second user satisfies the predetermined condition, the user image of the first user and the user image of the second user are changed to a design of a specific manner. In this embodiment, the design of the specific manner is a design of a reddish face, and this is represented by displaying a transversely elongated red oval on the normal design at positions corresponding to both of the cheeks. In a case that the image of the normal design stored in the memory of the game apparatus 10 in advance is used as an user image, this is changed to an image of the design of the reddish face stored in the memory in advance similarly. Furthermore, in a case that the first user and the second user use his or her own facial images as user images, transversely elongated red ovals are displayed (overwritten) at positions corresponding to both of the cheeks. Alternatively, when his or her own facial image is registered, a normal face and an awkward face of two kinds are registered, and the normal face may be switched to the awkward face.

Here, in place of displaying a reddish face design, the user image or its neighbor may be decorated. That is, in a case that the display manner of the user image is set to a specific display manner, if only the arrow is emphasized in comparison with the other cases, the method need not be restricted especially.

Furthermore, in a case that the degree of transmission of messages transmitted by the first user to the second user satisfies the predetermined condition, and the degree of reception of messages received by the first user from the second user satisfies the predetermined condition, the thickness of the arrow is set to "thick" on both sides of the user image of the first user and the user image of the second user. At this time, the color of the arrow is set to a specific color ("gold", for example) on both sides of the user image of the first user and the user image of the second user. For the convenience of the drawings, a stripe pattern is given to the arrow in order to show the specific color in FIG. 8(D) (this is true for FIG. 7).

Here, in place of setting the color of the arrow to the specific color, the arrow or the neighbor thereof may be decorated. That is, in a case that the display manner of the arrow is set to the specific display manner, if only the user image is emphasized in comparison with the other cases, the method need not be restricted especially.

Returning to FIG. 7, at the upper end of the relationship diagram displaying screen 300, a button image 340, a button image 342, a button image 344, a button image 346, and a button image 348 are displayed. The button image 340 is used for returning to the menu screen 100 shown in FIG. 5. The button image 342 is used for inquiring about the presence or absence of the message addressed to himself or herself in the server 502. The button images 344, 346, 348 are used for selecting a group in which the second users are registered. In this embodiment, the second user is classified as any one of the three groups, and thus, when the button images 344, 346, 348 are turned on, a user image as to the second user classified into a corresponding group is displayed in the display areas 304-314. At this time, as described above, on the basis of the degree of transmission of messages and the degree of reception of messages with each second user, the thickness of the arrow and the color of the arrow are set, and the set arrow is displayed. Here, in this embodiment, the second users up to six can be registered in each group. Furthermore, in a case that any second user is designated (touched), if both of the degree of transmission and the degree of reception satisfy the predetermined condition with the second user, the user image is changed to the specific display manner. This is because that on the relationship diagram displaying screen 300, a plurality of user images are displayed at a time, and this allows the first user to perceive that the user image is changed in association with which second user.

In addition, at the lower center of the relationship diagram displaying screen 300, a button image 350 is displayed. The button image 350 is used for directly making communication (transmission and reception of messages) with other game apparatuses 10 via the local communication module 66 without passing through the server 502 and the network 504.

Figure 9:
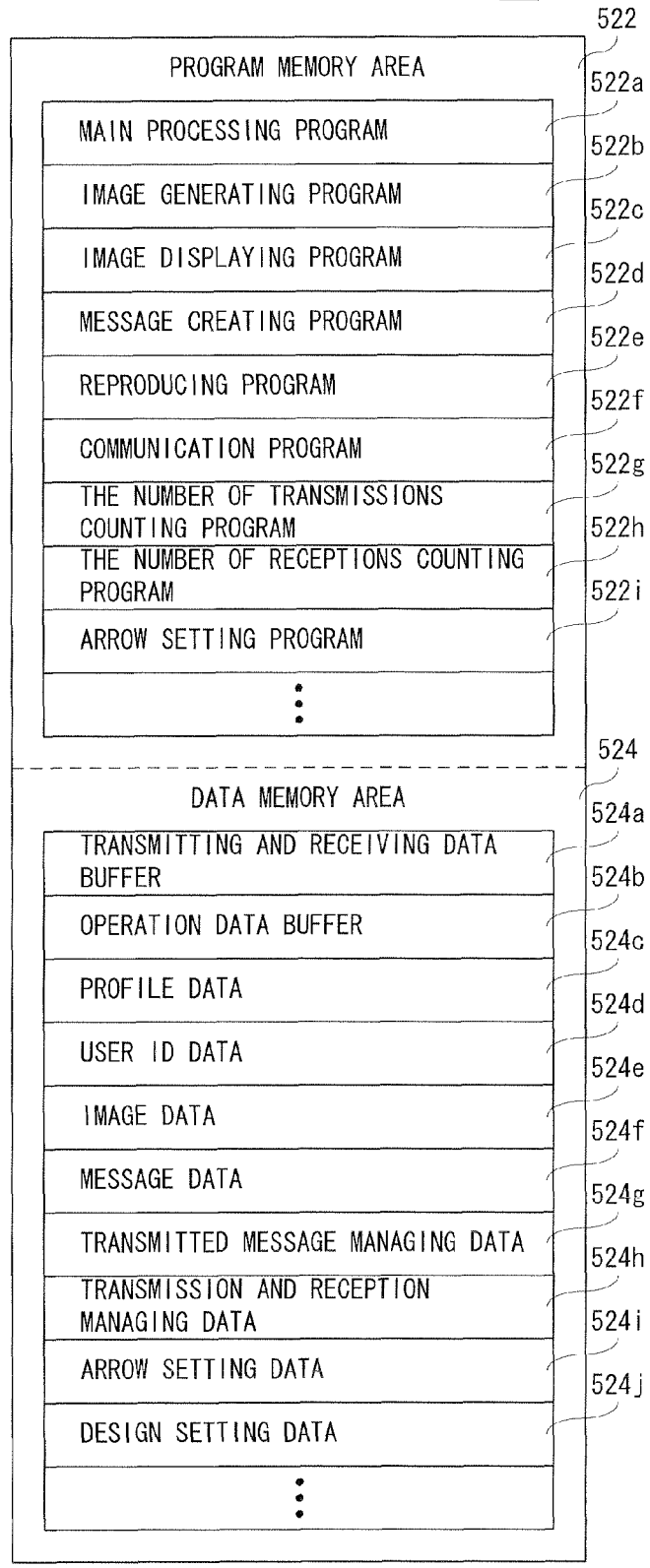
FIG. 9 is an illustrative view showing one example of a memory map of a main memory shown in FIG. 3.

FIG. 9 is an illustrative view showing an example of a memory map 520 of a main memory 52 of the game apparatus 10 shown in FIG. 3. As shown in FIG. 9, the main memory 52 includes a program memory area 522 and a data memory area 524. In the program memory area 522, an information processing program of this embodiment is stored. The information processing program is made up of a main processing program 522a, an image generating program 522b, an image displaying program 522c, a message creating program 522d, a reproducing program 522e, a communication program 522f, the number of transmissions counting program 522g, the number of receptions counting program 522h, an arrow setting program 522i, etc.

The main processing program 522a is a program for processing a main routine of the information processing of this embodiment. The image generating program 522b is a program for generating display image data to display various screens (100, 200, 300, etc.) on the first LCD 16 and the second LCD 18 by using the image data 524e described later. The image displaying program 522c is a program for displaying display image data generated according to the image generating program 522b on the first LCD 16 and the second LCD 18.

The message creating program 522d is a program for creating message data including at least one of a handwritten character or the like, a photograph and a voice. Accordingly, the message creating program 522d includes an imaging program for taking a photograph, a recording program for recording a voice as well as a handwriting program for drawing a handwritten character or the like. The reproducing program 522e is a program for reproducing drawn data of the handwritten character or the like, the photograph data and the audio data that are included in the message data created according to the message creating program 522d, and reproducing the drawn data of the handwritten character or the like, the photograph data and the audio data that are included in the message data received from other game apparatuses 10.

The communication program 522f is a program for making communications with other game apparatuses 10 and the computer (server 502, etc.) directly or via the network 504. The number of transmissions counting program 522g is a program for counting the number of transmissions of messages to one or a plurality of other game apparatuses 10 as communication objects for each game apparatus 10 (second user). The number of receptions counting program 522h is a program for counting the number of receptions of messages from one or a plurality of other game apparatuses 10 as communication objects for each game apparatus 10 (second user).

The arrow setting program 522i is a program for setting designs of the user image of the first user and one or a plurality of user images of the second user, and the thickness and the color of the arrow displayed between the user image of the first user and one or the plurality of user images of the second user on the basis of a counting result according to the number of transmissions counting program 522g and a counting result according to the number of receptions counting program 522h.

Although illustration is omitted, in the program memory area 522, a backup program, etc. is stored. The backup program is a program for saving the data stored in the main memory 52 in the memory for saved data 56 and the memory card 26.

The data memory area 524 is provided with a transmitting and receiving data buffer 524a and an operation data buffer 524b. In the transmitting and receiving data buffer 524a, message data to be transmitted or received message data are (temporarily) stored. In the operation data buffer 524b, operation data input from the operation button 20 and coordinate data input from the touch panel 22 are (temporarily) stored in chronological order.

Furthermore, in the data memory area 524, profile data 524c, user ID data 524d, image data 524e, message data 524f, transmitted message managing data 524g, transmission and reception managing data 524h, arrow setting data 524i, design setting data 524j, etc. are stored.

The profile data 524c is data as to a profile of the first user and one or a plurality of second users. Although detailed explanation is omitted, a user name, a user image, a voice (introduction, greeting voices) and a birthday, etc. are relevant as a profile. Although detailed explanation is omitted, the profile data of the first user is created according to an operation by the first user, and is transmitted (uploaded) to the server 502 when a request to issue a user ID described later is performed to the server 502. Furthermore, the profile data of the second user is received (downloaded) from the server 502 when it is registered as a communication object.

The user ID data 524d is data as to identification information assigned to the game apparatus 10 itself and identification information assigned to other game apparatus 10 registered as a communication object. Here, the user ID may be assigned to not the game apparatus 10, but the user of the game apparatus 10. Additionally, in this embodiment, in response to an issuing request from the game apparatus 10, the server 502 issues a user ID as to the game apparatus 10 from which the issuing request is made. Although illustration is omitted, when being registered as communication objects, other game apparatuses 10 (second users) are classified into groups, and thus, the user IDs of the other game apparatuses 10 are managed (stored) by the group. Furthermore, the server 502 may use an IP address, etc. in place of issuing a user ID.

The image data 524e is data, such as polygon data, texture data, etc. and data as to a plurality of kinds of the arrows (6 kinds in this embodiment). In this embodiment, data as to various arrows are stored in advance, and when the thickness of the arrow and the color of the arrow are set, image data (arrow data) of a corresponding arrow is read when the display image data is generated. Here, the arrow data need not be stored in advance, and may be generated in real time by using polygon data and texture data in accordance with the set thickness and color.

Additionally, in addition to the four kinds shown in FIG. 8(A)-FIG. 8(D), following two kinds of arrow data are stored in advance as the kind of the arrows. More specifically, the first kind is an arrow for which the thicknesses at both ends are set to "middle", and the colors at both ends are set to "orange". The second kind is an arrow for which the thickness at one end is "thin" and the thickness at the other end is set to "thick", and the color at the one end is set to "yellow", and the color at the other end is set to "red". Although illustration is omitted, as to the second arrow, the thickness and the color are different between at the one end and at the other end, and therefore, the thickness and the color are represented to be varied gradually. By displaying all the six kinds of arrows in a rotated and inversed manner, all the patterns can be contained.

The message data 524*f* is the created message data and the received message data. Although illustration is omitted, identification information (message ID) given (notified) by the server 502 is added to the message data.

The transmitted message managing data 524*g* is data for managing whether or not the message data transmitted to other game apparatus 10 is received by the other game apparatus 10. In this embodiment, the number of transmissions is counted not when the message data is transmitted to the other game apparatus 10, but when the message data is received by the other game apparatus 10, and therefore, the transmitted message managing data 524*g* is provided.

As shown in FIG. 10(A), in the transmitted message management table according to the transmitted message managing data 524*g*, a received-flag is described in correspondence with the message ID.

As described above, the message ID is identification information of the message data. This is given by the server 502 when message data is transmitted to the server 502, and the issued message ID is notified to the game apparatus 10 which has transmitted the message data. In FIG. 10(A), the message ID is shown by one alphabetic character, but this is one example, and there is no need of being restricted thereto. For example, the message ID is shown by numeric characters, shown by alphabetic characters and numeric characters, or shown by information indecipherable by a person.

The received-flag is a flag for determining whether or not message data indicated by a corresponding message ID is received by the addressed game apparatus 10 (second user). For example, in a case that the corresponding message data is received by the addressed game apparatus 10, the received-flag is turned on (established), and in a case that the corresponding message data is not received by the addressed game apparatus 10, the received-flag is turned off (unestablished).

Returning to FIG. 9, the transmission and reception managing data 524*h* is data for managing for each second user the number of transmissions of the transmitted messages (message data), a date and time (latest transmitting time) when a message is transmitted last, the number of receptions of the received messages, and the date and time (latest receiving time) when a message is received last. As shown in FIG. 10(B), in the transmission and reception managing table according to the transmission and reception managing data 524*h*, the number of transmissions, the latest transmitting time, the number of receptions, and the latest receiving time are described in correspondence with the user ID of the communication object.

As described above, the user ID of the communication object is identification information assigned to other game apparatus 10 registered as a communication object or the second user assigned to this other game apparatus 10. In FIG. 10(B), the user ID is shown by 4 alphabetic characters, but this is merely one example and there is no need of being restricted thereto. For example, the user ID may be shown by numeric characters, or may be shown by alphabetical characters and numeric characters.

The number of transmissions indicates the number of message data that is transmitted to the game apparatus 10 indicated by the user ID of the corresponding communication object. The latest transmitting time indicates the transmitting time when the message data is transmitted last to the game apparatus 10 indicated by the user ID of the corresponding communication object. In this embodiment, the latest transmitting time (this holds true for the "latest receiving time" described later) is a 12-digit numeric character. From the head (from the left end), the years of Christian era are indicated by a two-digit numeric character, the month and date is indicated by a four-digit numeric character, and the time (hour, minute, second) is indicated by a six digit-numeric character. Thus, in a case that "091016211436" is described as the latest transmitting time, the year, date and time when the message is transmitted last is on Oct. 16, 2009, at 21:14:36, for example.

The number of receptions indicates the number of message data received from the game apparatus 10 indicated by the user ID of the corresponding second user. The latest receiving time indicates a receiving time when the message data is received last from the game apparatus 10 indicated by the user ID of the corresponding communication object. As described above, in this embodiment, the latest receiving time is shown by a 12-digit numeric character.

Returning to FIG. 9, the arrow setting data 524*i* is data for deciding (for selecting arrow data) the kind of an arrow to be displayed between the user images when the relationship diagram displaying screen 300 is displayed. Although illustration is omitted, the arrow setting data 524*i* is stored for each other game apparatus 10 (user ID) registered as a communication object, and stores information (data) of the thickness and the color of the arrow as to the side of the user image of the player and the side of the user image of the user indicated by each user ID in correspondence with each user ID. Here, in this embodiment, the thickness and the color of the arrow is a one-to-one correspondence, and thus, it is only necessary to store any one of the information. The arrow setting data 524*i* is generated (updated) on the basis of the above-described transmission and reception managing data 524*h*. Here, even if other game apparatuses 10 have been registered as communication objects, as to the other game apparatus 10 which has never made transmission and reception of the message data, NULL data is stored by being brought into correspondence with the user ID.

The design setting data 524*j* is data describing a user ID as to the game apparatus 10 of the communication object in a case that the thickness of the arrow indicated by the arrow setting data 524*i* is set to "thick" with respect to the two-way direction of the arrow. According to the design setting data 524*j*, the design of the user image is changed to a reddish face as described above.

Although illustration is omitted, in the data memory area 524, sound data for outputting a sound effect, BGM is stored, and a flag and a counter (timer) necessary for information processing are provided.

FIG. 11-FIG. 15 is a flowchart showing entire processing by the CPU 50 of the game apparatus 10 shown in FIG. 3.

Figure 11:
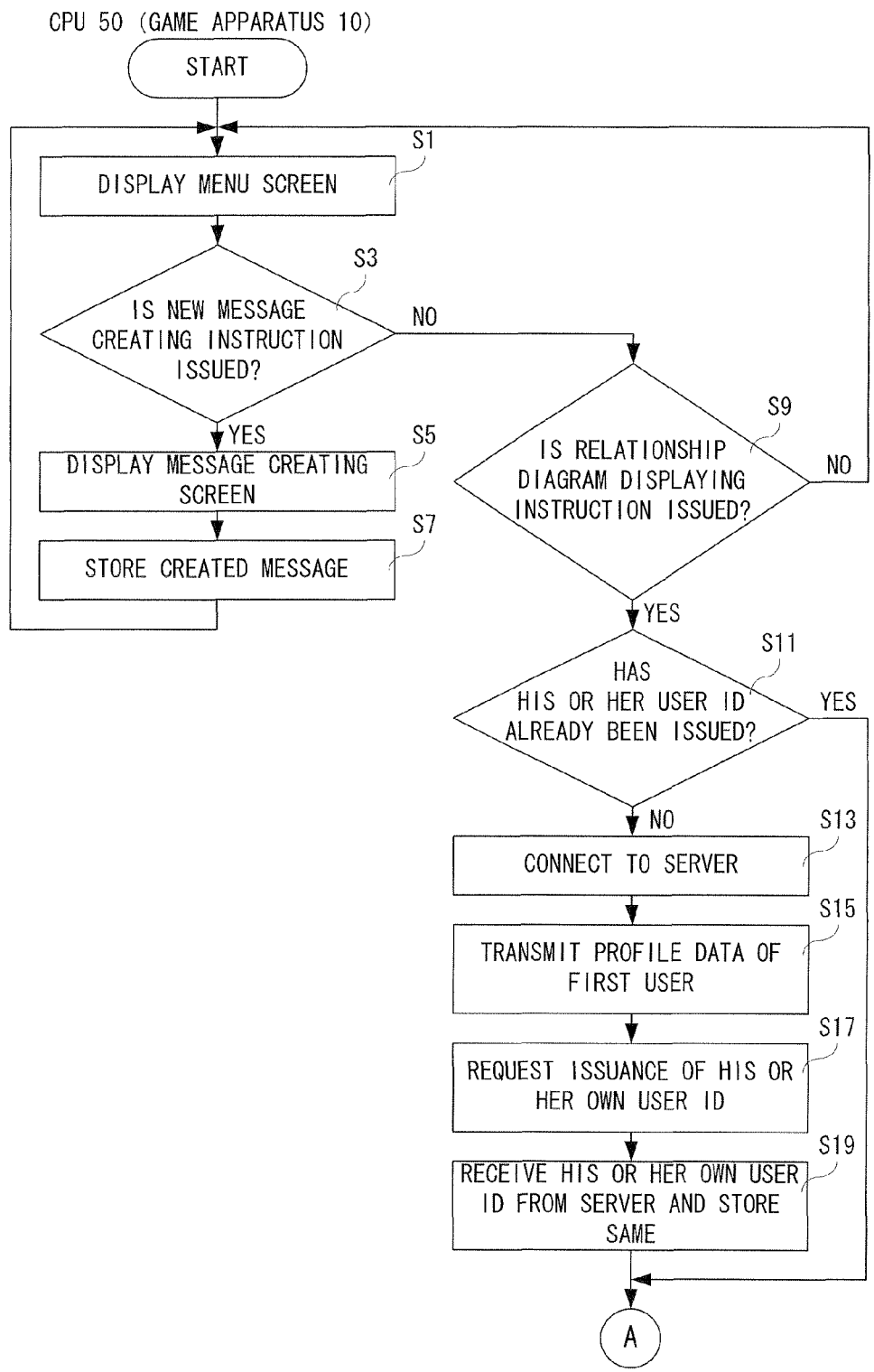
FIG. 11 is a flowchart showing a first part of entire processing by a CPU of the game apparatus shown in FIG. 3.

As shown in FIG. 11, when starting the entire processing, the CPU 50 displays a menu screen 100 shown in FIG. 5 on the second LCD 18 in a step S1. In a next step S3, it is determined whether or not a new message creating instruction is issued. That is, the CPU 50 determines whether or not the button image 116 is turned on. More specifically, the CPU 50 determines whether or not the coordinate data stored in the operation data buffer 524b designates the position where the button image 116 displayed on the second LCD 18 is drawn. This holds true for whether or not the button image is turned on is determined hereunder.

If "YES" in the step S3, that is, if a new message creating instruction is issued, a message creating screen 200 shown in FIG. 6 is displayed on the second LCD 18 in a step S5. Although illustration is omitted, when the user creates a message by drawing a handwritten character or the like, taking a photograph, inputting a voice, and turns the button image 204 on, storing the message data corresponding to the created message is instructed. In response thereto, the CPU 50 stores the message data corresponding to the created message in the main memory 52 in a step S7, and the process returns to the step S1.

Furthermore, if "NO" in the step S3, that is, if a new message creating instruction is not issued, it is determined whether or not a relationship diagram displaying instruction is issued in a step S9. That is, the CPU 50 determines whether or not the button image 114 is turned on. If "NO" in the step S9, that is, a relationship diagram displaying instruction is not issued, the process returns to the step S1 as it is.

It should be noted that if "NO" in the step S9 in FIG. 11, the process returns to the step S1 as it is, but if the button image 104 and the button image 106 are turned on, the message transmitted or received in the previous month or the next month is displayed in the display area 102 as described above. Alternatively, if the button image 110 and the button image 112 are turned on, the message (1020-1024) displayed in the display area 102 is moved from side to side. Further alternatively, when the button image 118 is turned on, various screens for setting not shown are displayed to allow for erasing of a message (message data), editing of grouping the second user, the possibility or impossibility of moving the message data to the memory card 26, and the possibility or impossibility of transferring and editing of the message data, as described above.

If "YES" in the step S9, that is, if a relationship diagram displaying instruction is issued, it is determined whether or not the user ID of him or her (first user) has been issued in a step S11. That is, the CPU 50 determines whether or not his or her own user ID is registered in the user ID data 524d. If "YES" in the step S11, that is, if his or her own user ID has already been issued, the process proceeds to a step S21 shown in FIG. 12.

On the other hand, if "NO" in the step S11, that is, if his or her own user ID has not yet been issued, a connection is made to the server 502 in a step S13, the profile data of the first user is transmitted to the server 502 in a step S15, and issuance of his or her own user ID is requested to the server 502 in a step S17. When a user ID is issued in the server 502 in response thereto, his or her own user ID is received from the server 502 and stored in the main memory 52 in a step S19, and the process proceeds to the step S21.

In the step S21 shown in FIG. 12, relationship diagram displaying processing (see FIG. 16-FIG. 19) described later is executed, and it is determined whether or not the user image of the second user is selected in a step S23. Here, the CPU 50 determines whether or not any one of the user images of the second user is turned on (touched). Here, a determination method as to whether a user image is turned on is the same as the determination method whether the button image is turned on, and therefore, the duplicated explanation is omitted.

If "NO" in the step S23, that is, if the user image of the second user is not selected, a message receiving instruction is issued in a step S25. Here, the CPU 50 determines whether or not the button image 342 is turned on. If "YES" in the step S25, that is, if a message data receiving instruction is issued, the process proceeds to a step S51 shown in FIG. 13. On the other hand, if "NO" in the step S25, that is, if a message data receiving instruction is not issued, the process proceeds to a step S73 shown in FIG. 15.

Furthermore, if "YES" in the step S23, that is, if the user image of the second user is selected, it is determined whether or not the user image of the game apparatus 10 of its own and the selected user image of the second user are set to the design when the strength of the friendship is high referring to the design setting data 524j in a step S27. If "NO" in the step S27, that is, if the user image of the game apparatus 10 of its own and the user image of the selected second user are not set to the design when the strength of the friendship is high, the process proceeds to a step S31 as it is. On the other hand, if "YES" in the step S27, that is, if the user image of the game apparatus 10 of its own and the user image of the selected second user are set to the design when the strength of the friendship is high, the design when the strength of the friendship is high is displayed in a step S29, and the process proceeds to the step S31. In this embodiment, in the step S29, the user image of the first user and the user image of the second user are displayed in reddish face designs. However, as described later, when the user image of another second user is selected, the design when the strength of the friendship is high is displayed until just before, and in a case that "NO" is determined in the current step S27, the user image of the first user and the user image of the other second user are displayed in a normal design.

In the step S31, a profile of the second user corresponding to the user image of the selected second user is displayed on the first LCD 16. In a next step S33, it is determined whether or not a message transmitting instruction is issued. Although omitted in FIG. 7, when any one of the user images of the second user is selected, a button image for prompting a transmission is displayed in front of the user image. The CPU 50 determines whether or not the button image for prompting a transmission is turned on. Here, in stead of the button image for prompting a transmission being displayed in front of the user image, displacement to the button image for prompting a transmission may be performed.

If "NO" in the step S33, that is, if a transmission instruction of message data is not issued, it is determined whether or not the user image of the other second user is selected in a step S35. If "NO" in the step S35, that is, if the user image of the other second user is not selected, the process returns to the step S33 as it is. On the other hand, if "YES" in the step S35, that is, if the user image of the other second user is selected, the process returns to the step S27. That is, the CPU 50 changes the design of the user image and the display of the profile in response to the other second user being selected.

Figure 13:
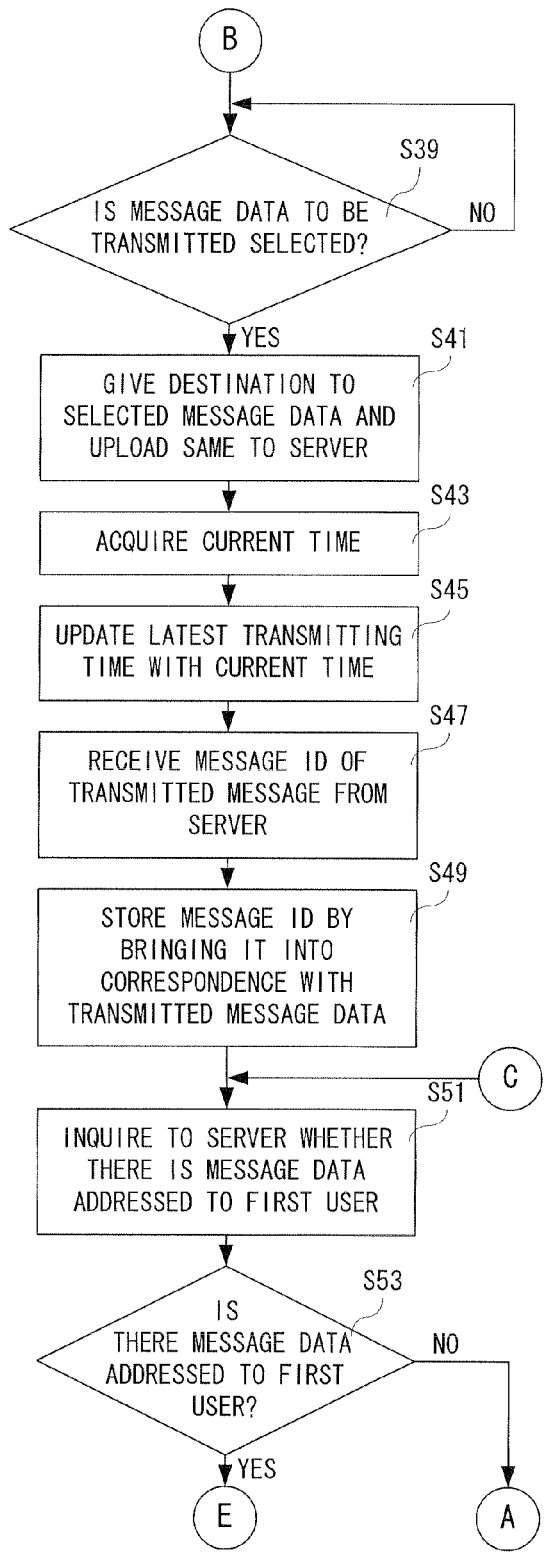
FIG. 13 is a flowchart sequel to FIG. 12 showing a third part of the entire processing by the CPU of the game apparatus shown in FIG. 3.
Figure 14:
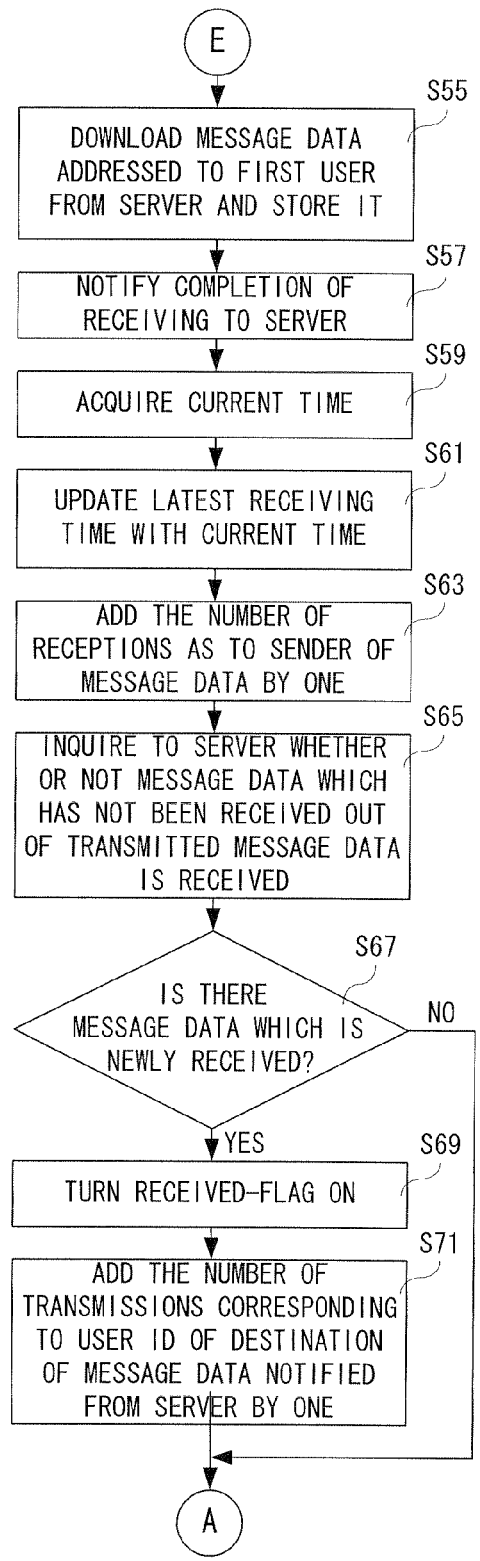
FIG. 14 is a flowchart sequel to FIG. 13 showing a fourth part of the entire processing by the CPU of the game apparatus shown in FIG. 3.

On the other hand, if "YES" in the step S33, that is, if a transmission instruction of the message data is issued, all the messages are displayed as a list (not illustrated) in a step S37. Here, an all-message-list displaying screen may be made as in the menu screen 100 in FIG. 5. Then, as shown in FIG. 13, in a next step S39, it is determined whether or not message data to be transmitted is selected. If "NO" in the step S39, that is, if message data to be transmitted is not selected, the process returns to the step S39 as it is to wait for a selection of the message data. On the other hand, if "YES" in the step S39, that is, if message data to be transmitted is selected, a destination is given to the message data corresponding to the selected message, and the server 502 is uploaded with it in a step S41. It should be noted that the CPU 50 gives the user ID corresponding to the user image of the second user which is determined to be selected in the step S23 or the step S35 as destination to the message data.

In a succeeding step S43, the current time is acquired. Here, the CPU 50 acquires the years of Christian era, the date and time, and the current time from the RTC 68. In a next step S45, the latest transmitting time is updated with the current time. That is, the CPU 50 updates the latest transmitting time corresponding to the user ID being the destination of the message data with the years of Christian era, the date and time and the current time that are acquired in the step S43 in the transmission and reception managing table shown by the transmission and reception managing data 524h.

Succeedingly, in a step S47, the message ID of the message data transmitted in the step S41 is received from the server 502. When the message data is uploaded, the message ID is given to the message data by the server 502, and the result is received from the server 502. In a next step S49, the message ID is stored by being brought into correspondence with the message data transmitted in the step S41. Furthermore, at this time, the CPU 50 adds the message ID to the transmitted message management table indicated by the transmitted message managing data 524g, and turns the received-flag corresponding to the message ID off.

Next, in the step S51, whether or not there is a message addressed to the first user is inquired of the server 502. That is, the CPU 50 inquires of the server 502 whether or not there is a message addressed to the user ID assigned to the game apparatus 10 of its own. In a succeeding step S53, it is determined whether or not there is message data addressed to the first user. That is, the CPU 50 determines whether or not a notification that there is the message data addressed to the first user is received from the server 502.

Figure 12:
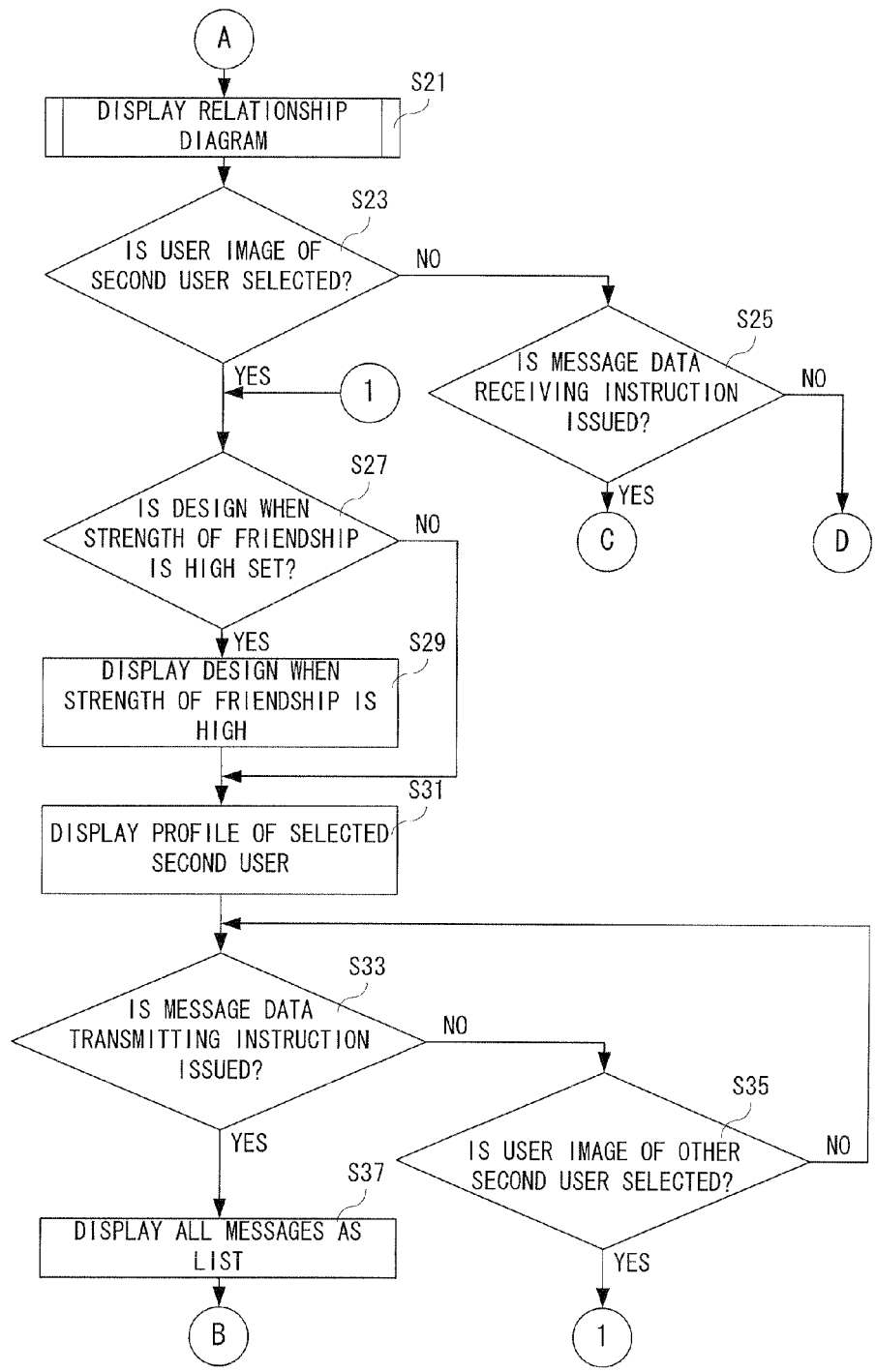
FIG. 12 is a flowchart sequel to FIG. 11 showing a second part of the entire processing by the CPU of the game apparatus shown in FIG. 3.

If "NO" in the step S53, that is, if there is no message data addressed to the first user, the process returns to the step S21 shown in FIG. 12 as it is. On the other hand, if "YES" in the step S53, that is, if there is message data addressed to the first user, the message data addressed to the first user is downloaded from the server 502, and stored in the data memory area 524 in a step S55 shown in FIG. 14. Then, in a step S57, a completion of the receiving is notified to the server 502.

In a succeeding step S59, the current time is acquired, and in a step S61, the latest receiving time is updated with the current time. The processing in the steps S59 and S61 is similar to those in the above-described steps S43 and S45, and therefore, a duplicated explanation is omitted. In a next step S63, the number of receptions as to the sender of the message data is added by one. Here, the CPU 50 adds one to the number of receptions corresponding to the user ID as to the sender of the message data in the transmission and reception managing table indicated by the transmission and reception managing data 524h.

Next, in a step S65, the server 502 is inquired whether or not the message data which has not been received out of the transmitted message data is received by the second user (another game apparatus 10 as a communication object) as a transmitting end. Here, the CPU 50 transmits the message IDs of all the messages for which the received-flag is turned off in the transmitted message management table indicated by the transmitted message managing data 524g to the server 502, and inquires whether or not the message data indicated by these message IDs remain in the database 506. In a next step S67, it is determined whether or not there is message data which is newly received. Here, the CPU 50 acquires the message ID of the message data remaining in the database 506 out of the message data to which the message IDs are given which has been transmitted to the server 502 from the server 502, and determines whether or not one or the plurality of message IDs acquired from the server 502 and one or the plurality of message IDs for which the received-flag is turned off are different from each other.

In a case that a message ID ("objective message ID" for the sake of convenience of description) which is not included in one or the plurality of message IDs that are acquired from the server 502 exists in the one or a plurality of message IDs for which the received-flag is turned off, it is determined that the message data indicated by one or a plurality of objective message IDs are newly received by the second user as a receiving end. However, in a case that a message ID which is not included in one or the plurality of message ID acquired from the server 502 and the one or a plurality of message ID for which the received-flag is turned off entirely match, it is determined that there is no message data which is newly received by the second user as a receiving end.

If "NO" in the step S67, that is, if there is no message data which is newly received, the process returns to the step S21 as it is. On the other hand, if "YES" in the step S67, that is, if there is message data which is newly received, the received-flag of the message data is turned on in a step S69. That is, the CPU 50 turns on the received-flag as to the message data which is determined to be newly received in the transmitted message management table. Then, in a step S71, the number of transmissions corresponding to the user ID of the destination given to the message data which is determined to be newly received is added by one in the transmission and reception managing table, and the process returns to the step S21. Here, if there are a plurality of message data which are newly received, the number of transmissions of the user ID is added by the corresponding number.

Here, in this embodiment, in a case that a message is received in other game apparatus 10 as a communication object, the number of transmissions is added, but the number of transmissions may be added at a time when a message is transmitted.

Figure 15:
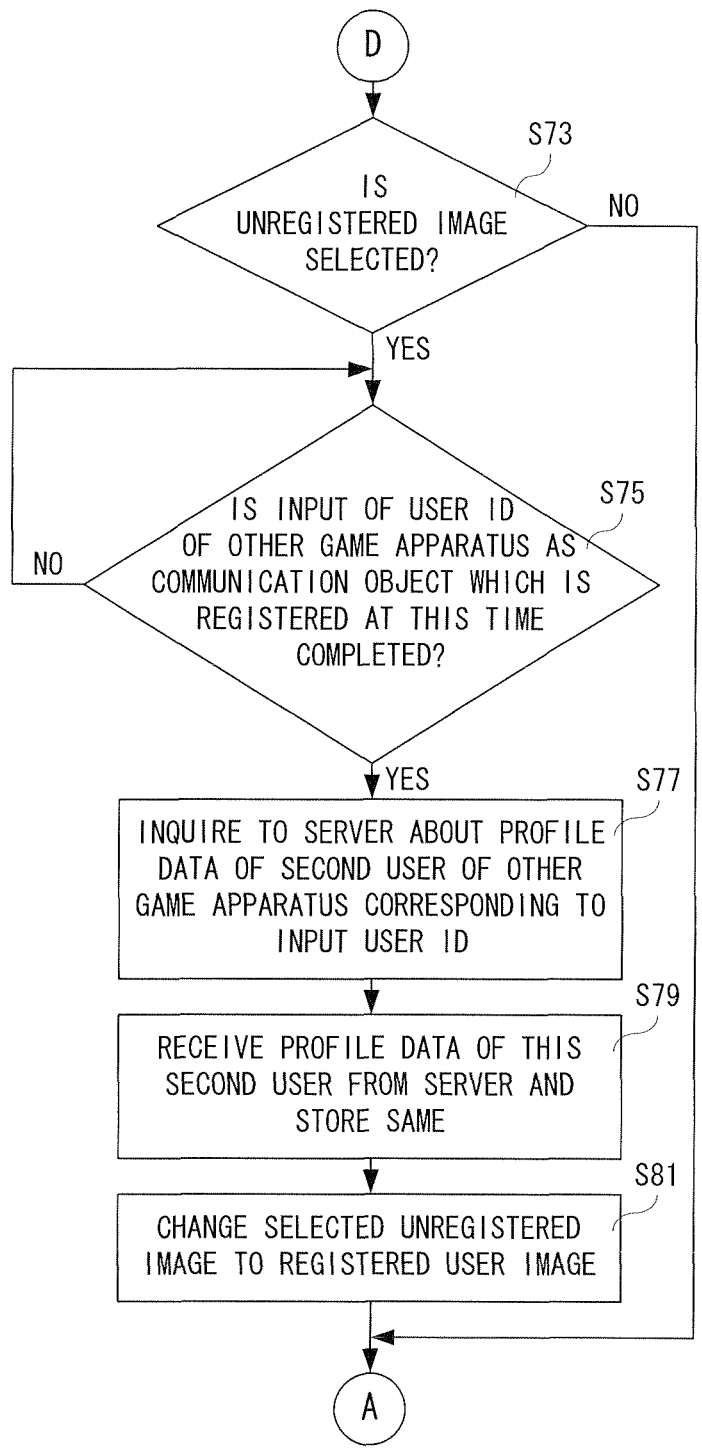
FIG. 15 is a flowchart sequel to FIG. 12 showing a fifth part of the entire processing by the CPU of the game apparatus shown in FIG. 3.

As described above, in the step S25, it is determined that a message receiving instruction is not issued, and when "NO", it is determined whether or not an unregistered image is selected in a step S73 shown in FIG. 15. For example, it is determined whether or not the unregistered image 304a or the unregistered image 310a is turned on on the relationship diagram displaying screen 300 shown in FIG. 7. If "NO" in the step S73, that is, if the unregistered image is not selected, the process returns to the step S21 as it is. On the other hand, if "YES" in the step S73, that is, if the unregistered image is selected, it is determined whether or not an input of the user ID of the game apparatus 10 (second user) as a communication object which is currently registered is completed in a step S75. Here, the user ID of the other game apparatus 10 (second user) as a communication object is input by the first user, and the CPU 50 determines whether or not the input of the user ID as to the other game apparatus 10 (second user) as a communication object is completed.

If "NO" in the step S75, that is, if an input of the user ID of the other game apparatus 10 as a communication object is not completed, the process returns to the same step S75 as it is. On the other hand, if "YES" in the step S75, that is, if an input of the user ID as to the other game apparatus 10 as a communication object is completed, the profile data of the second user of the other game apparatus 10 indicated by the input user ID is inquired of the server 502 in a step S77. In a next step S79, the profile data of the second user is received from the server 502, and stored in the data memory area 524 of the main memory 52. Then, in a step S81, the selected unregistered image is changed to the registered user image, and the process returns to the step S21. Although a detailed explanation is omitted, in the step S81, the CPU 50 displays the user image by using the image data (image data of the normal image or the facial image) included in the received profile data.

Figure 16:
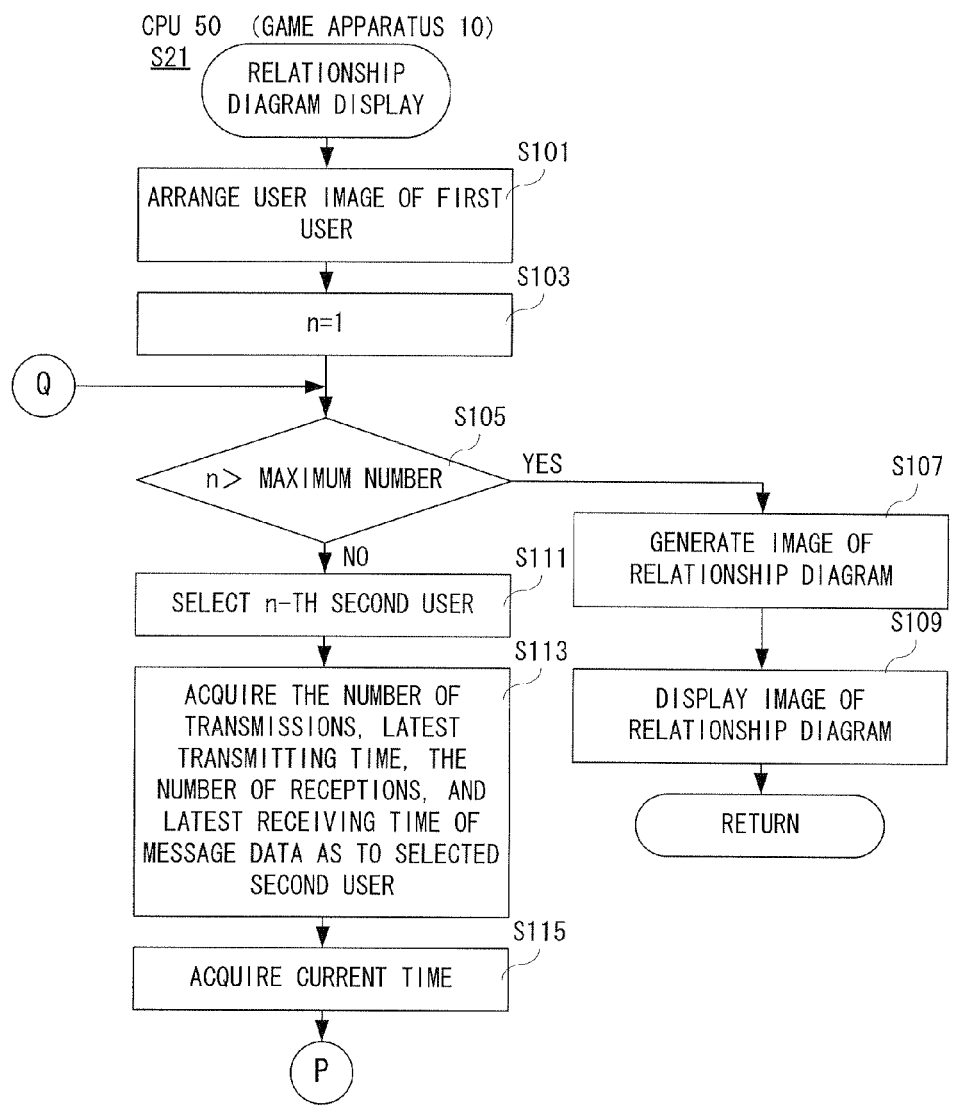
FIG. 16 is a flowchart showing a first part of relationship diagram displaying processing by the CPU of the game apparatus shown in FIG. 3.
Figure 17:
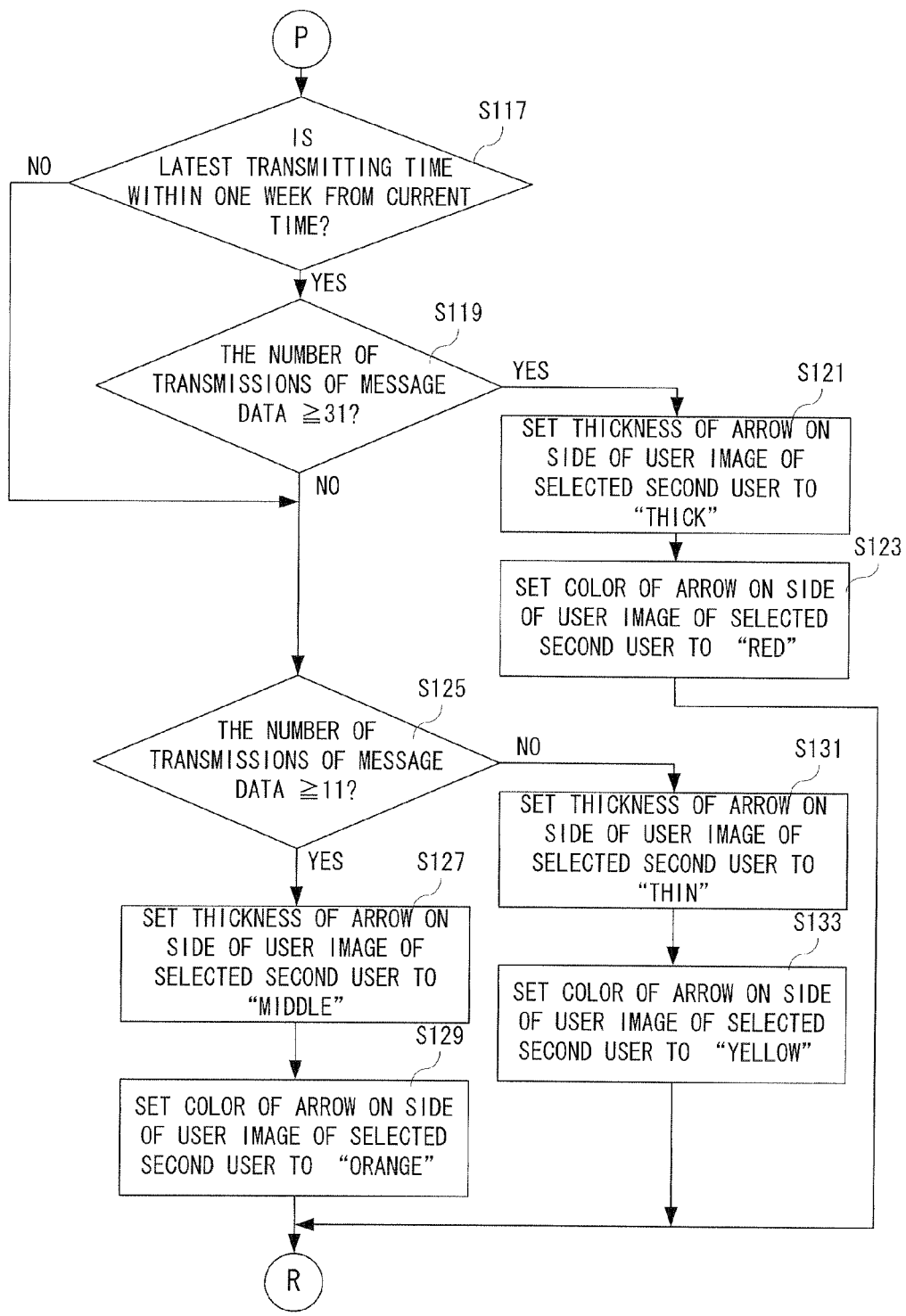
FIG. 17 is a flowchart sequel to FIG. 16 showing a second part of the relationship diagram displaying processing by the CPU of the game apparatus shown in FIG. 3.

FIG. 16 to FIG. 19 is a flowchart of the relationship diagram displaying processing in the step S21 shown in FIG. 12. As shown in FIG. 16, when starting the relationship diagram displaying processing, the CPU 50 arranges the user image of the first user in a step S101. Here, the second GPU 76 arranges the user image of the first user at a predetermined position of the second VRAM 80 under the instruction from the CPU 50. In this embodiment, the predetermined position is a position corresponding to an approximately the center of the screen when the relationship diagram displaying screen 300 is displayed on the second LCD 18 and which is decided in advance. The same is true below in a point that when the user image is arranged, it is arranged at the position decided in advance.

In a next step S103, an initial value is set to a variable n (n=1). The variable n is set for individually identifying one or a plurality of the game apparatuses 10 (second users) as communication objects. Although detailed explanation is omitted, the relationship diagram displaying screen 300 is displayed by the groups, and thus, strictly speaking, the variable n is set for individually identifying one or a plurality of second users in the selected group.

Successively, in a step S105, it is determined whether or not the variable n is above a maximum number (6, in this embodiment). If "YES" in the step S105, that is, if the variable n is above the maximum number, it is determined that display settings of the arrows as to the user images of all the second users are completed, and in a step S107, an image of the relationship diagram is generated. Here, by arranging the image data of the user image of the second user at a predetermined position, or by arranging the arrow data of the kind according to the display setting (arrow setting data 524i) in a direction according to the display setting, display image data as to the relationship diagram displaying screen 300 is generated. Here, "displaying the arrow data in a direction according to the display setting" means that the arrow data is arranged such that the thickness and the color of the arrow that are set on the side of the user image of the first user and the thickness and the color of the arrow that are set on the side of the user image of the second user are accurate. Here, the position and angle at which the arrow data is arranged are decided in advance in correspondence with the positions where the image data of the user image of the second user is arranged, and the direction of the arrow data is decided according to the display setting. Then, in a step S109, the image of the relationship diagram is displayed on the second LCD 18, and the process returns to the entire processing shown in FIG. 11-FIG. 15.

On the other hand, if "NO" in the step S105, that is, if the variable n is equal to or less than the maximum number, the n-th second user is selected in a step S111. More specifically, the user ID of the n-th second user is specified. As a selecting order of the second user, the second user is selected in ascending order of the number given to the display area (304-314) of the user image, for example. This is one example, and the second user (other game apparatus 10 as a communication object) may be selected in a registering order as a communication object. In a following step S113, with reference to the transmission and reception managing table indicated by the transmission and reception managing data 524h, the number of transmissions of message data, the latest transmitting time, the number of receptions of the message, and the latest receiving time corresponding to the user ID of the selected second user are acquired.

Next, in a step S115, the current time is acquired. Then, in a step S117 shown in FIG. 17, it is determined whether or not the latest transmitting time is within a week from the current time. More specifically, the CPU 50 subtracts the latest transmitting time (12-digit numeral indicating the years of Christian era, the month and date and the time) acquired in the step S113 from the current time (12-digit numeral indicating the years of Christian era, the month and date and the time), and determines whether or not the result is within one week (equal to or less than "000007000000").

It should be noted that the subtracting processing is performed by the hexadecimal system as to a certain part (the last 2 digits representing seconds, for example), and by the decimal system as to another part (the first 2 digits representing years, for example).

If "NO" in the step S117, that is, if the latest transmitting time is after one week from the current time, the process proceeds to a step S125. On the other hand, if "YES" in the step S117, that is, if the latest transmitting time is within one week from the current time, it is determined whether or not the number of transmissions of the message data acquired in the step S113 is equal to or more than 31 in a step S119. If "NO" in the step S119, that is, if the number of transmissions of the message data is less than 31, the process proceeds to the step S125 as it is.

Figure 18:
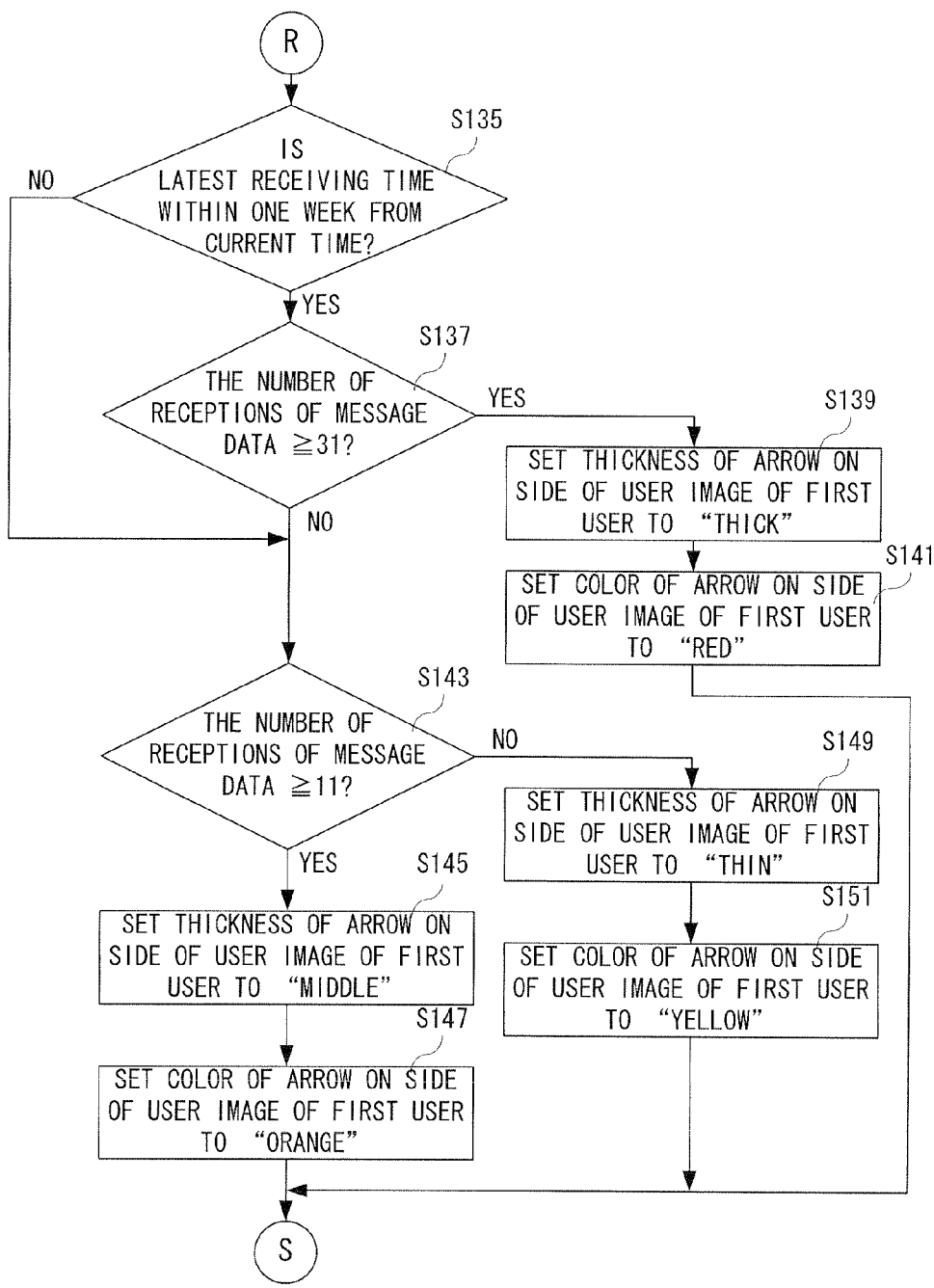
FIG. 18 is flowchart sequel to FIG. 17 showing a third part of the relationship diagram displaying processing by the CPU of the game apparatus shown in FIG. 3.

On the other hand, if "YES" in the step S119, that is, if the number of transmissions of the message data is equal to or more than 31, it is determined that the transmission frequency is high, the thickness of the arrow on the side of the user image of the selected second user is set to "thick" in a step S121, the color of the arrow on the side of the user image of the selected second user is set to "red" in a step S123, and the process proceeds to the step S135 shown in FIG. 18.

Furthermore, in a step S125, it is determined whether or not the number of transmissions of the message data acquired in the step S113 is equal to or more than 11. If "YES" in the step S125, that is, if the number of transmissions of the message data is equal to or more than 11, it is determined that the transmission frequency is moderate, the thickness of the arrow is set to "middle" on the side of the user image of the selected second user in a step S127, the color of the arrow on the side of the user image of the selected second user is set to "orange" in a step S129, and the process proceeds to a step S135.

On the other hand, if "NO" in the step S125, that is, if the number of transmissions of messages is less than 11 it is determined that the transmission frequency is low, the thickness of the arrow on the side of the user image of the selected second user is set to "thin" in a step S131, the color of the arrow of the user image of the selected second user is set to "yellow" in a step S133, and the process proceeds to the step S135.

As shown in FIG. 18, in the step S135, it is determined whether or not the latest receiving time acquired in the step S113 is within one week from the current time. This determination method is the same as that explained in the step S117, and therefore, the duplicated explanation is omitted. If "NO" in the step S135, that is, if the latest receiving time is after one week from the current time, the process proceeds to a step S143 as it is.

On the other hand, if "YES" in the step S135, that is, if the latest receiving time is within one week from the current time, it is determined whether or not the number of receptions of the messages acquired in the step S113 is equal to or more than 31 in a step S137. If "NO" in the step S137, that is, if the number of receptions of the messages is less than 31, the process proceeds to the step S143.

Figure 19:
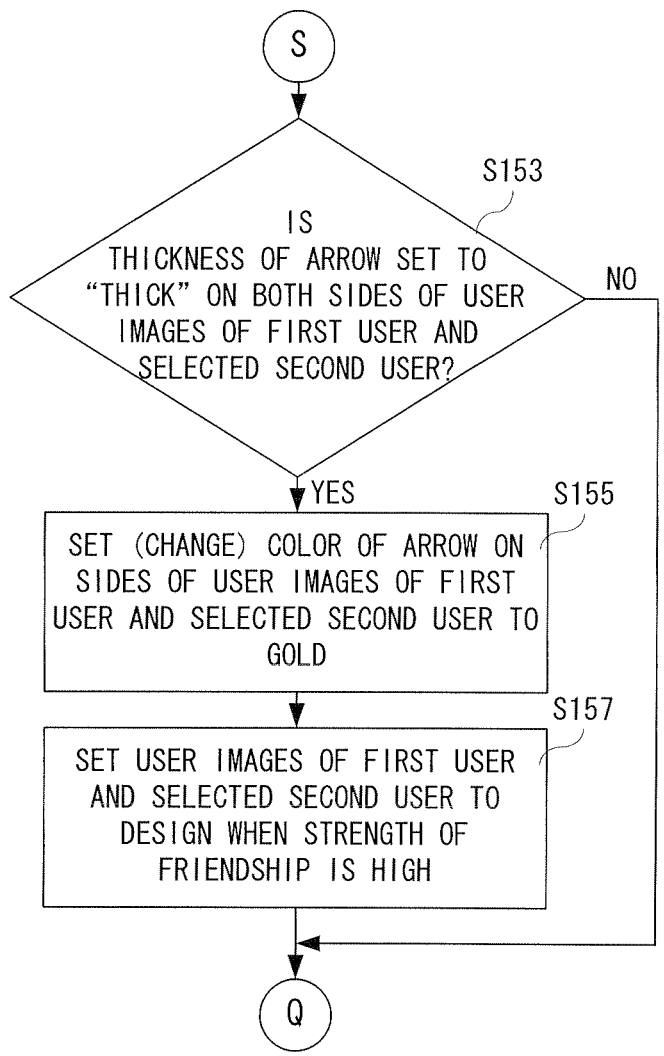
FIG. 19 is flowchart sequel to FIG. 18 showing a fourth part of the relationship diagram displaying processing by the CPU of the game apparatus shown in FIG. 3.

On the other hand, if "YES" in the step S137, that is, if the number of receptions of the message data is equal to or more than 31, it is determined that a reception frequency is high, the thickness of the arrow on the side of the user image of the first user is set to "thick" in a step S139, and the color of the arrow on the side of the user image of the first user is set to "red" in a step S141, and the process proceeds to a step S153 shown in FIG. 19.

Furthermore, in the step S143, it is determined whether or not the number of receptions of the message data acquired in the step S113 is equal to or more than 11. If "YES" in the step S143, that is, if the number of receptions of the message data is equal to or more than 11, it is determined that the reception frequency is moderate, the thickness of the arrow on the side of the user image of the first user is set to "middle" in a step S145, and the color of the arrow on the side of the user image of the first user is set to "orange" in a step S147, and the process proceeds to the step S153.

On the other hand, if "NO" in the step S143, that is, if the number of receptions of the message data is less than 11, it is determined that the reception frequency is low, the thickness of the arrow on the side of the user image of the first user is set to "thin" in a step S149, the color of the arrow on the side of the user image of the first user is set to "yellow" in a step S151, and the process proceeds to the step S153.

As shown in FIG. 19, it is determined whether or not the thickness of the arrow is set to "thick" on both sides of the user images of the first user and the selected second user in the step S153. If "NO" in the step S153, that is, if the thickness of the arrow is not set to "thick" on at least one of the sides of the user images of the first user and the selected second user, the process returns to the step S105 shown in FIG. 16 as it is.

On the other hand, if "YES" in the step S153, that is, if the thickness of the arrow is set to "thick" on both sides of the user images of the first user and the selected second user, the color of the arrow on the sides of the user image of the first user and the selected second user is set (changed) to gold in a step S155. Then, in a next step S157, the user images of the first user and the selected second user are set to the design in a case that the strength of the friendship is high; that is, the user ID of the game apparatus 10 of the selected second user is registered in the design setting data 524j, and the process returns to the step S105.

Figure 20:
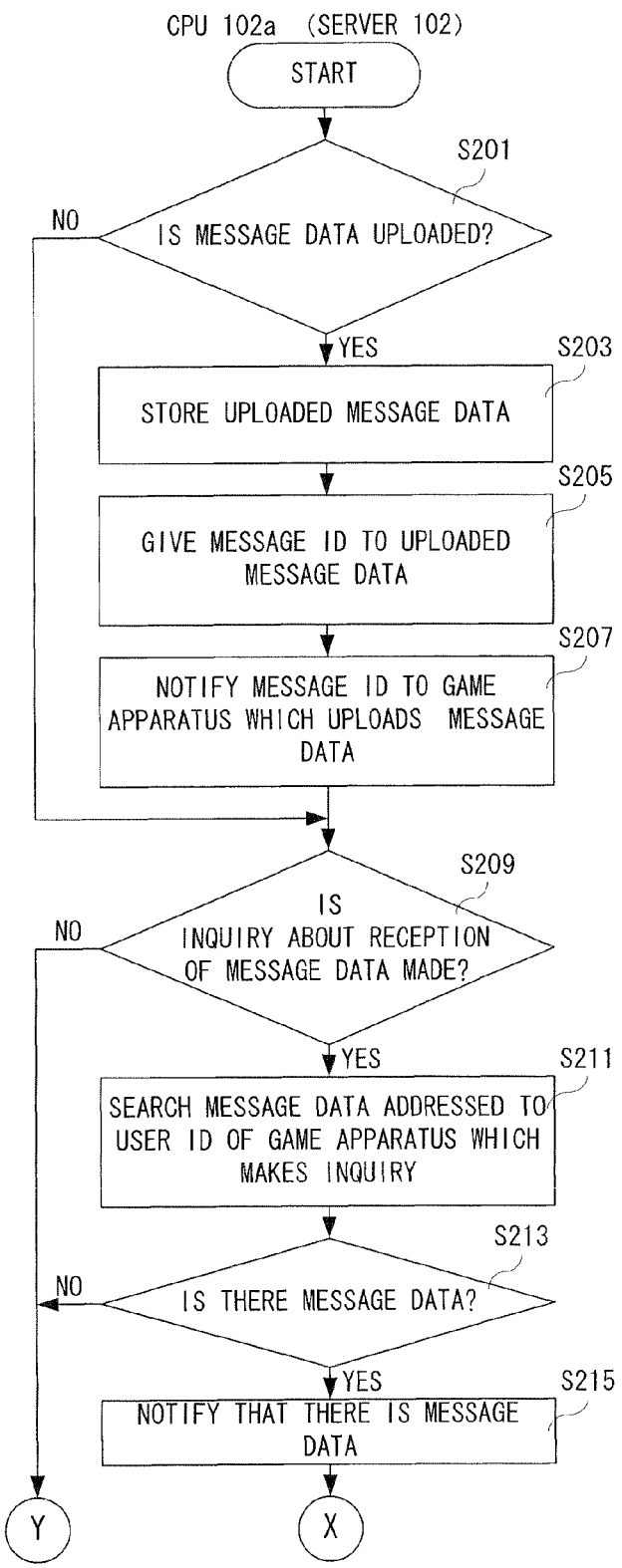
FIG. 20 is a flowchart showing a part of entire processing by the CPU of a server shown in FIG. 4.
Figure 21:
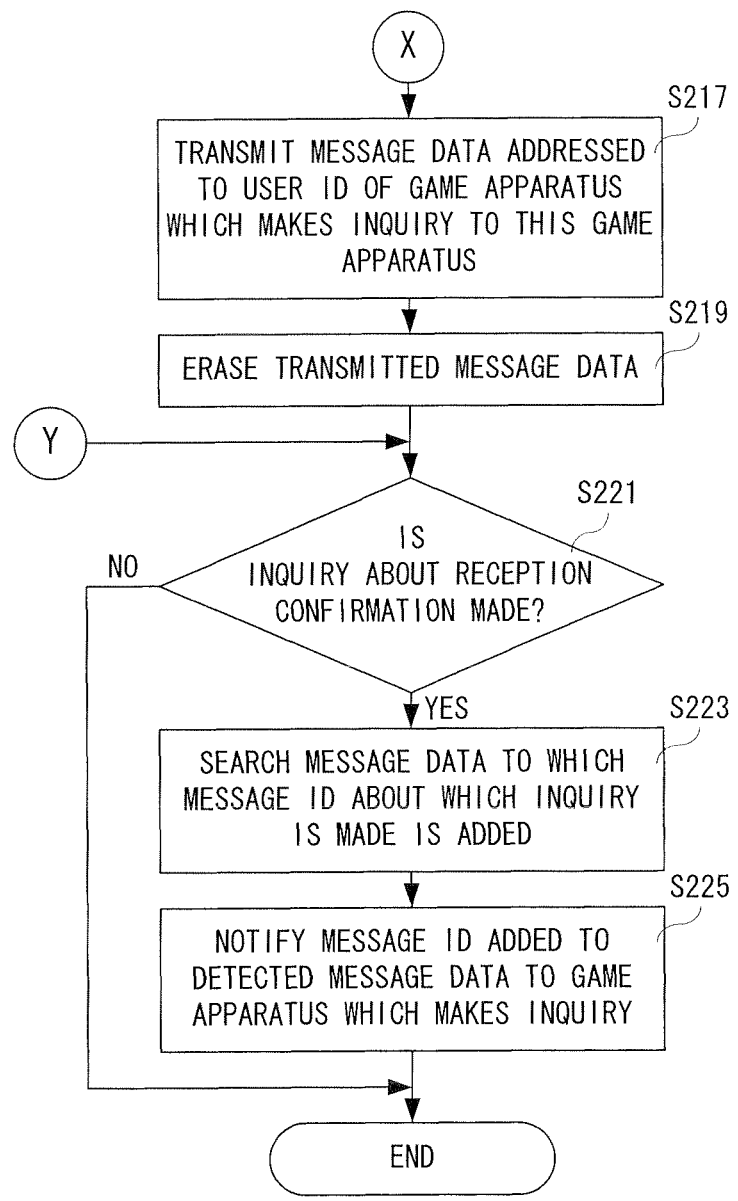
FIG. 21 is a flowchart sequel to FIG. 20 showing another part of the entire processing by the CPU of the server shown in FIG. 4.

FIG. 20 and FIG. 21 show a flowchart showing the entire processing by the CPU 502a of the server 502. As shown in FIG. 20, when starting the entire processing, the CPU 502a determines whether or not the message data is uploaded in a step S201. If "NO" in the step S201, that is, if the message data is not uploaded, the process proceeds to a step S209 as it is.

Although illustration is omitted, when a communicated situation is established with the game apparatus 10, the CPU 502a starts entire processing. Furthermore, after the communicated situation is established, every time that a request (inquiry) from the game apparatus 10 is present, the CPU 502a starts the entire processing. In addition, depending on processing capability of the CPU 502a, when a communicated situation is established with a plurality of game apparatuses 10, the entire processing is individually executed with each game apparatus 10.

On the other hand, if "YES" in the step S201, that is, if the message data is uploaded, the uploaded message data is stored in the database 506 in a step S203. In a succeeding step S205, a message ID is given to the uploaded message data. At this time, the message ID is added to the message data stored in the database 506 in the step S203. Or, the message ID is stored by being brought into correspondence with the message data stored in the database 506 in the step S203. Then, in a step S207, the message ID is notified to the game apparatus 10 which uploads the message data, and the process proceeds to the step S209.

In the step S209, it is determined whether or not an inquiry about a reception of the message data is made. If "NO" in the step S209, that is, if an inquiry about a reception of the message data is not made, the process proceeds to a step S221 shown in FIG. 21 as it is. On the other hand, if "YES" in the step S209, that is, if an inquiry about a reception of the message data is made, the message data addressed to the user ID of the game apparatus 10 which makes the inquiry is searched (detected) from the database 506 in a step S211. Then, in a step S213, it is determined whether or not there is the message data. That is, the CPU 502a determines whether or not the message data addressed to the user ID of the game apparatus 10 which makes the inquiry is stored in the database 506.

If "NO" in the step S213, that is, if there is no message data, the process proceeds to the step S221 as it is. On the other hand, if "YES" in the step S213, that is, if there is message data, the game apparatus 10 which makes the inquiry is notified that there is message data in a step S215, and the message data addressed to the user ID of the game apparatus 10 which makes the inquiry is transmitted to the game apparatus 10 in a step S217 shown in FIG. 21. Then, in a step S219, the transmitted message data is erased from the database 506, and the process proceeds to the step S221.

In the step S221, it is determined whether or not an inquiry about a reception confirmation is made. If "NO" in the step S221, that is, if an inquiry about a reception confirmation is not made, the entire processing is ended as it is. On the other hand, if "YES" in the step S221, that is, if an inquiry about a reception confirmation is made, as to all the message IDs transmitted from the game apparatus 10 during the inquiry, the message data to which the message ID is added is searched (detected) from the database 506 in a step S223. In a next step S225, the message ID added to each of all the detected message data is notified to the game apparatus 10 which makes the inquiry, and the entire processing is ended.

According to this embodiment, the thickness and the color of the arrow indicating two ways displayed between the user images are changed depending on the number of transmissions of the message data and the number of receptions of the message data, and therefore, it is possible to easily and visually show the degree of transmission and the degree of reception. Thus, it is possible to easily know the degree of favor from one user to the other user and the degree of favor from the other user to the one user which are represented by the degree of transmission and the degree of reception. Moreover, it is easily know the strength of the friendship between the users.

The game apparatus 10 of another embodiment is the same as the above-described embodiment except that the arrow arranged between the user images is displayed so as to be separated into two as to an arrow directed from one to the other and an arrow directed from the other to the one, and therefore, duplicated explanation is omitted.

FIG. 22(A)-FIG. 22(D) show an example of user images, and arrows displayed between the user images of this another embodiment. FIG. 22(A) shows a display manner of the user image and the arrows in a case that the number of transmissions of messages transmitted by the first user to the second user is equal to or less than 10, and the number of receptions of the messages received by the first user from the second user is equal to or less than 10. More specifically, the user image of the first user and the user image of the second user are displayed by a normal design. The thickness of the arrow directed from the side of the user image of the first user to the side of the user image of the second user is set to "thin", and the color of the arrow is set to "yellow". Furthermore, the thickness of the arrow directed from the side of the user image of the second user to the side of the user image of the first user is set to "thin", and the color of the arrow is set to "yellow".

Additionally, FIG. 22(B) shows a display manner of the user images and the arrows in a case that the number of transmissions of messages transmitted by the first user to the second user is equal to or more than 11 and equal to or less than 30, and the number of receptions of the messages received by the first user from the second user is equal to or less than 10. More specifically, the user image of the first user and the user image of the second user are displayed by the normal design. The thickness of the arrow directed from the side of the user image of the first user to the side of the user image of the second user is set to "middle", and the color of the arrow is set to "orange". Furthermore, the thickness of the arrow directed from the side of the user image of the second user to the side of the user image of the first user is set to "thin", and the color of the arrow is set to "yellow".

In addition, FIG. 22(C) shows a display manner of the user images and the arrows in a case that the number of transmissions of messages transmitted by the first user to the second user is equal to or more than 31, and the latest transmitting time is within one week from the current time, and in a case that the number of receptions of the messages received by the first user from the second user is equal to or more than 31, but the latest receiving time is after one week from the current time. More specifically, the user image of the first user and the user image of the second user are displayed in a normal design. The thickness of the arrow directed from the side of the user image of the first user to the side of the user image of the second user is set to "thick", and the color of the arrow is set to "red". Furthermore, the thickness of the arrow directed from the side of the user image of the second user to the side of the user image of the first user is set to "middle", and the color of the arrow is set to "orange".

In addition, FIG. 22(D) shows a display manner of the user images and the arrows in a case that the degree of transmission of the messages transmitted by the first user to the second user satisfies a predetermined condition, and in a case that the degree of reception of the messages received by the first user from the second user satisfies the predetermined condition. More specifically, the user image of the first user and the user image of the second user are displayed by the design when the strength of the friendship is high. The design when the strength of the friendship is high is a reddish face design similar to the above-described embodiment. The thickness of the arrow directed from the side of the user image of the first user to the side of the user image of the second user is set to "thick", and the color of the arrow is set to a specific color (gold, for example). For the convenience of the drawings, horizontal stripes are given to the arrow for the purpose of representing a special color in FIG. 22(D). Similarly, the thickness of the arrow directed from the side of the user image of the second user to the side of the user image of the first user is set to "thick", and the color of the arrow is set to "gold".

Here, the predetermined condition is the same as the predetermined condition shown in the above-described embodiment, and therefore, the duplicated explanation is omitted.

More specifically, the processing by the CPU 50 is the same as the aforementioned embodiment except that a part of the relationship diagram displaying processing in the above-described embodiment is different, and therefore, the duplicated explanation is omitted, and only the difference is explained.

Figure 23:
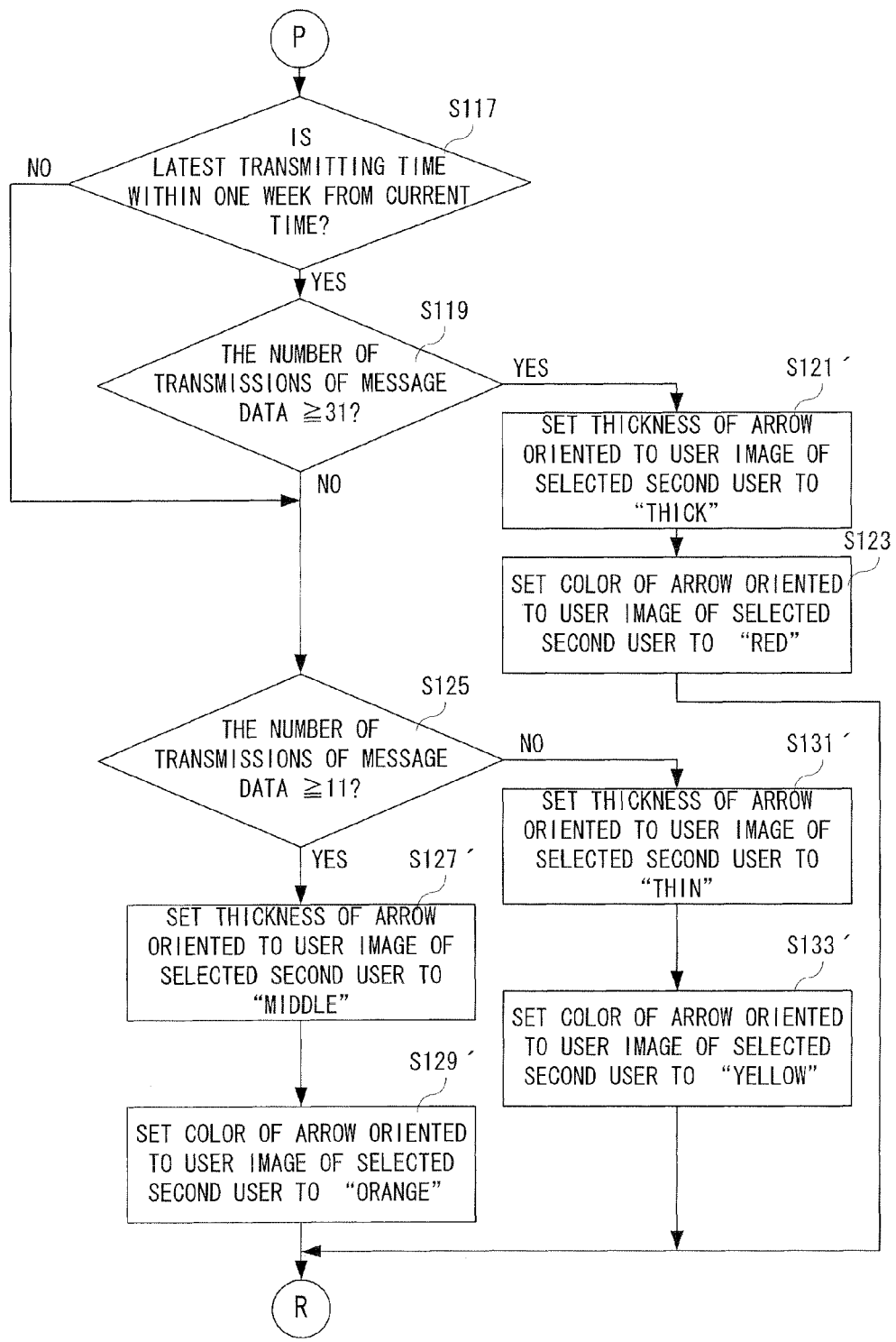
FIG. 23 is a flowchart showing a first part of relationship diagram displaying processing by the CPU of the game apparatus in another embodiment.
Figure 24:
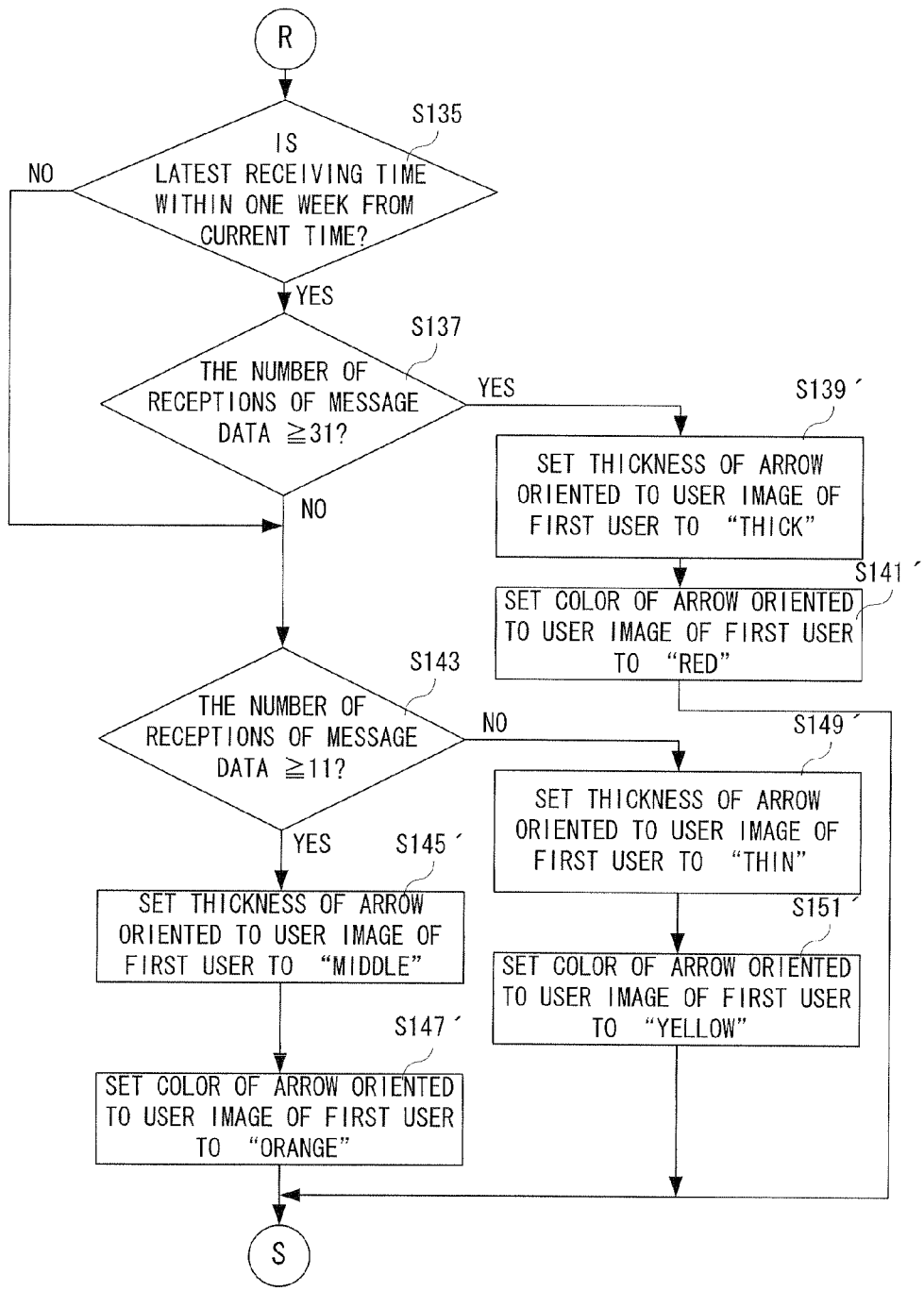
FIG. 24 is a flowchart sequel to FIG. 23 showing a second part of the relationship diagram displaying processing by the CPU of the game apparatus in this another embodiment.
Figure 25:
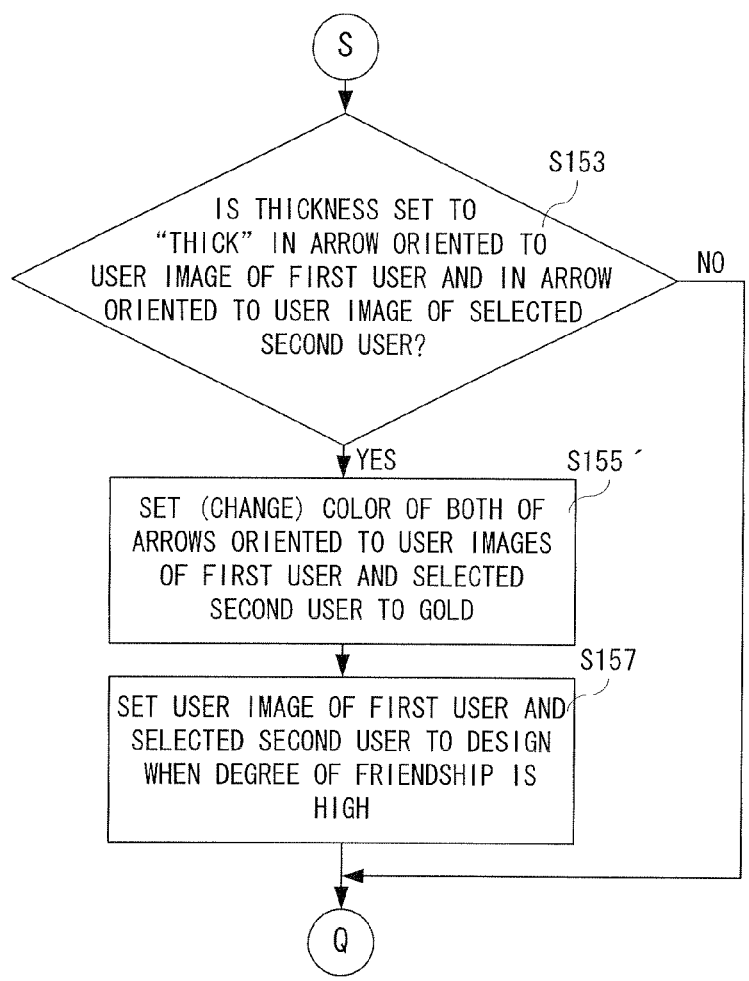
FIG. 25 is a flowchart sequel to FIG. 24 showing a third part of the relationship diagram displaying processing by the CPU of the game apparatus in another embodiment.

FIG. 23-FIG. 25 show a flowchart showing a part of the relationship diagram displaying processing. In the flowchart of the relationship diagram displaying processing in this another embodiment, the same reference numerals are given to the processing being identical to the relationship diagram displaying processing of the above-described embodiment. As shown in FIG. 23, if "YES" in the step S119, that is, if the degree of transmission is high, the thickness of the arrow oriented to the user image of the selected second user is set to "thick" in a step S121', and the color of the arrow oriented to the user image of the selected second user is set to "red" in a step S123', and the process proceeds to a step S135 shown in FIG. 24.

Furthermore, if "YES" in the step S125, that is, if the degree of transmission is moderate, the thickness of the arrow oriented to the user image of the selected second user is set to "middle" in a step S127', the color of the arrow oriented to the user image of the selected second user is set to "orange" in a step S129', and the process proceeds to the step S135 shown in FIG. 24.

In addition, if "NO" in the step S125, that is, if the degree of transmission is low, the thickness of the arrow oriented to the user image of the selected second user is set to "thin" in a step S131', the color of the arrow oriented to the user image of the selected second user is set to "yellow" in a step S133', and the process proceeds to the step S135 shown in FIG. 24.

As shown in FIG. 24, if "YES" in the step S137, that is, if the degree of reception is high, the thickness of the arrow oriented to the user image of the first user is set to "thick" in a step S139', the color of the arrow oriented to the user image of the first user is set to "red" in a step S141', and the process proceeds to a step S153 shown in FIG. 25.

Furthermore, if "YES" in the step S143, that is, if the degree of reception is moderate, the thickness of the arrow oriented to the user image of the first user is set to "middle" in a step S145', the color of the arrow oriented to the user image of the first user is set to "orange" in a step S147', and the process proceeds to the step S153.

In addition, if "NO" in the step S143, that is, if the degree of reception is low, the thickness of the arrow oriented to the user image of the first user is set to "thin" in a step S149', the color of the arrow oriented to the user image of the first user is set to "yellow" in a step S151', and the process proceeds to the step S153.

As shown in FIG. 25, if "YES" in the step S153, that is, if the thickness is set to "thick" in the arrow oriented to the user image of the first user and the arrow oriented to the user image of the selected second user, both of the colors of the arrow oriented to the user image of the first user and the arrow oriented to the user image of the second user are set (changed) to "gold" in a step S155', and the process proceeds to a step S157.

In this another embodiment as well, similar to the above-described embodiment, it is possible to know the degree of favor from one user to the other user and the degree of favor from the other user to the one user which are represented by the degree of transmission and the degree of reception. In addition, it is easily know the strength of the friendship between the users.

Additionally, in the above-described embodiments, one arrow designating two ways is displayed between the user images, and if the thickness and the color of the arrow are different in both ends, the thickness (shape) and the color are displayed so as to be smoothly changed. Alternatively, two arrows indicating from one to the other and indicating from the other to the one are displayed. However, there is no need of being restricted thereto. For example, as shown in FIG. 26(A), arrows each having different thicknesses and different colors may be connected at the center to display one arrow representing tow ways.

Furthermore, in the above-described embodiment, the arrow is displayed between the user images, but there is no need of being restricted thereto. For example, in place of the arrow, a design imitating a pen may be displayed. The point that thickness and color of the pen are changed depending on the number of transmissions of the message data and the number of receptions of the message data is the same as the above-described embodiment. Alternatively, a finger mark may be displayed as shown in FIG. 26(B), a symbol of an inequality sign may be displayed as shown in FIG. 26(C), and a triangle design may be displayed as shown in FIG. 26(D), for example. Still alternatively, a moving object may be displayed so as to move to a direction from P1 to P2 or a direction from P2 to P1 inside the quadrangle frame as shown in FIG. 26(E). For example, the magnitude of the number of transmissions of the message data and the number of receptions of the message data can be represented by changing the color, the number, or the size (width) of the finger mark, the inequality sign, the triangle, the moving object.

Furthermore, in the above-described embodiment, by the thickness of the arrow and the color of the arrow, the number of transmissions of the message data (degree of transmission) and the number of receptions of the message data (degree of reception) are represented, but they may be represented by changing any one of them, that is, by changing only the color of the arrow or by changing only the thickness of the arrow.

In addition, in the above-described embodiment, depending on the number of transmissions of the message data (degree of transmission) and the number of receptions of the message data (degree of reception), the color of the arrow is changed, but the tone of the color (brightness) as to a single color (including black) may be changed. For example, the more the number of transmissions of the message data and the number of receptions of the message data are, the deeper (darker) the color of the arrow is, and the less the number of transmissions of the message data and the number of receptions of the message data are, the paler (lighter) the color of the arrow is. On the contrary thereto, the more the number of transmissions of the message data and the number of receptions of the message data are, the paler (lighter) the color of the arrow may be, the less the number of transmissions of the message data and the number of receptions of the message data are, the deeper (darker) the color of the arrow may be.

In the above-described embodiment, only when the degree of transmission and the degree of reception satisfy the predetermined conditions, the user image is changed to the design when the strength of friendship is high, but there is no need of being restricted thereto. For example, depending on the number of transmissions of the message data and the number of receptions of the message data, the display manner, such as a color of the user image, a size of the user image, or facial expressions of the user image, etc. may be changed gradually or continuously.

In addition, in the above-described embodiment, each of the thickness of the arrow and the color of the arrow is classified into three, but it may be classified into further kinds. In such a case, the strength of the friendship and the degree of favor between the first user and each second user can be known by a relative difference in the respective second users. Here, even if each of the thickness of the arrow and the color of the arrow is classified into two kinds, the difference in the number of transmissions (degree of transmission) of the message data and the number of receptions of the message data (degree of reception) can be represented.

In addition, in this embodiment, the arrow corresponding to the number of transmissions and the number of receptions between the first user and the second user is displayed, but the arrow corresponding to the number of transmissions and the number of receptions between the second users may also be displayed. In such a case, when the message data is uploaded in the server, the number of transmissions and the number of receptions between the first user and the second user are uploaded in the server, and when the presence or absence of the message data is inquired to the server, or when an inquiry about a reception confirmation of the message data is made to the server, the number of transmissions and the number of receptions between other game apparatuses (second users) which its own game apparatus (first user) registers as communication objects may be downloaded.

Furthermore, in the above-described embodiment, in a case that the number of transmissions of the message data and the number of receptions of the message data are equal to or more than the predetermined numbers, and the latest transmitting time and the latest receiving time are within one week, the thickness of the arrow is set to "thick", but in a case that any one of them is satisfied, the thickness of the arrow may be set to "thick".

In addition, in the above-described embodiment, both of the degree of transmission of the message data and the degree of reception of the message data satisfy the predetermined conditions, the user image is changed to a reddish face design, and the color of the arrow is set to gold, but there is no need of being restricted thereto. For example, the predetermined condition as to the degree of transmission is set such that the number of transmissions is less than 10, and the latest transmitting time is after three weeks, and as to the degree of reception as well, the predetermined condition is set such that the number of receptions is less than 10, and the latest receiving time is after three weeks. Then, in a case that both of the degree of transmission and the degree of reception satisfy the predetermined conditions, the user image and the arrow are displayed in a specific manner different from that in the above-described embodiment. For example, the user image is changed to a crying face design, and the color of the arrow is set to gray. That is, in a case that the degree of transmission and the degree of reception are low, the user image and the arrow are displayed in a manner such that the degree of favor or the strength of the friendship in the tow-way direction are low.

Moreover, in the above-described embodiment, the display manner of the user image and the arrow are changed on the basis of the number of transmissions of the message data and the number of receptions of the message data, but the display manner of the user image and the arrow may be changed depending on the data amount of transmitted message data (this means a cumulative total value) and the data amount of received message data. This is because that it is considered that the degree of favor and the strength of the friendship are different between when message data as to a message of a short sentence, such as merely "Good afternoon" is transmitted or received and when message data as to a message of a long sentence and a message including a photograph and a sound is transmitted or received. Furthermore, in addition to the number of transmissions of the message data and the number of receptions of the message data, the display manner of the arrow may be changed depending on the data amount of the transmitted message data and the data amount of the received message data.

Additionally, in the above-described embodiment, the message data is give a user ID of a destination and is uploaded to the server while the game apparatus as a destination accesses the server to download the message data addressed to it, but there is no need of being restricted thereto. For example, the message data may be transmitted and received in an electronic mail format, and the message data may be transmitted and received by directly making communications between the game apparatuses via a short distance wireless communication and over a P to P (peer-to-peer network). In addition, message data may be simultaneously transmitted to a plurality of other game apparatuses by designating a plurality of destinations at a time.

In addition, in the above-described embodiment, the number of transmissions of the message data and the number of receptions of the message data are counted in each game apparatus, but there is no need of being restricted thereto. For example, the CPU of the server may count the number of transmissions of the message data and the number of receptions of the message data for each game apparatus, and a server or a database accessible by the server may control the number of transmissions of the message data and the number of receptions of the message data for each game apparatus.

Moreover, in this embodiment, an information processing apparatus (game apparatus) is made up of the transmitter (50, 64, S41), the degree of transmission detector (50, S71), the receiver (50, 64, S55), the degree of reception detector (50, S63), and the index displayer (50, S21), but there is no need of being restricted thereto. The information processing apparatus (game apparatus) may be a system (hereinafter referred to as "client system") being made up of a separate computer including each of the aforementioned means or a plurality of computers including two or more means out of the aforementioned means. Furthermore, the client system is made up of one computer including all of the aforementioned means.

In addition, in the above-described embodiment, by utilizing the relationship diagram displaying screen, the relationship between the users is represented in a two-dimensional manner, but it may be represented in a three-dimensional manner. For example, an element of the time may be added. In brief, a depth is given to the arrow in correspondence with the time element. Then, in a case that the latest transmitting time and the latest receiving time are within one week from the current time, the depth of the arrow is increased. On the other hand, in a case that the latest transmitting time and the latest receiving time are after one week from the current time, the depth is decreased. This is one example, and there is no need of being restricted thereto. For example, the latest transmitting time and the latest receiving time are determined by more threshold values, and the depth of the arrow is changed in three levels or more, or the depth of the arrow may be changed not gradually but continuously (linearly).

Alternatively, the designs of the users and the arrows being made up of the relationship diagram are arranged in a three-dimensional space, and an arranging position of the design is moved according to a temporal concept, such as the latest transmitting time and the latest receiving time in a Z direction (depth direction), or the direction of the arrow may also be extended in the Z direction in response thereto.

Additionally, in the above-described embodiment, the three groups are provided, and six users can be registered for each group, but there is no need of being restricted thereto. The number of groups to be classified and the number of players to be registered may be more or less than those in the aforementioned embodiment.

In addition, in the above-described embodiment, the message data is transmitted and received, and the number of transmissions and the number of receptions are counted, but the data to be transmitted and received may be other text data, image data such as characters, items, etc., and sound (music) data, etc. except for voices. Moreover, in the above-described embodiment, the message data is created, but data stored in advance and the data read from the external memory (memory card 26, memory card 28) may be transmitted and received.

In addition, in the above-described embodiment, the time is acquired from the RTC of the game apparatus, but the time may be acquired from the server. In such a case, it is considered that errors of the time among the game apparatuses can be absorbed.

Additionally, in the above-described embodiment, the degree of favor or the strength of the friendship is represented by using the user images and the arrows, but by one index including them, the degree of favor or the strength of the friendship may be represented. Furthermore, when the design of the user image is changed, without changing a part of the facial image, it may be changed to a totally different design, or a totally different design may be added (a symbol, such as "!" may be displayed, for example).

In addition, in this embodiment, a case that a hand-held type game apparatus is used is explained, but a console-type game apparatus and other information processing apparatuses, such as a personal computer, a PDA, a mobile telephone can be used. Accordingly, a display such as an LCD and a CRT (a monitor of a television receiver in a case of a console-type game apparatus) may be provided to be integrated with the information processing apparatus, or separately provided with the information processing apparatus so as to be connected.

Furthermore, the configuration of the game apparatus need not be restricted to the above-described embodiment. For example, one camera may be appropriate. Additionally, a touch panel may not be provided. In addition, a touch panel may be provided on the two LCDs.

Although the present technology has been described and illustrated in detail, it is clearly understood that the same is by way of illustration and example only and is not to be taken by way of limitation, the spirit and scope of the present technology being limited only by the terms of the appended claims.

What is claimed is:

1. A non-transitory storage medium storing an information processing program, said information processing program causing a computer of an information processing apparatus to perform at least:
   transmitting data to another information processing apparatus;
   detecting a degree of transmission of the transmitted data;
   receiving data from said another information processing apparatus;
   detecting a degree of reception of the received data;
   displaying on a display a first design set and registered by a user of own information processing apparatus and a second design set and registered by a user of said another information processing apparatus, and
   displaying on said display a mark having a design of the manner that individually identifies the detected degree of transmission and the detected degree of reception between said first design and said second design.

2. The non-transitory storage medium according to claim 1, wherein
   said data is message data, and said information processing program causes the computer of said information processing apparatus to further perform
   registering of identification information of said another information processing apparatus in an identification information storage,
   creating said message data,
   designating the identification information of said another information processing apparatus as a destination, and
   transmitting the created message data to said another information processing apparatus indicated by the identification information as to the designated destination.

3. The non-transitory storage medium according to claim 1, wherein
   the computer further performs displaying as said mark a two-way arrow which changes in thickness on a side of said first design in accordance with said degree of reception, and changes in thickness on a side of said second design in accordance with said degree of transmission.

4. The non-transitory storage medium according to claim 1, wherein
   the computer further performs displaying as said marks a first arrow which changes in thickness in accordance with said degree of transmission and is directed from said first design to said second design, and a second arrow which changes in thickness in accordance with said degree of reception and is directed from said second design to said first design.

5. The non-transitory storage medium according to claim 1, wherein
   the computer further performs detecting the number of transmissions of the transmitted data, detecting the number of receptions of the received data, and displaying said mark of the manner that can individually identify the number of transmissions and the number of receptions.

6. The non-transitory storage medium according to claim 1, wherein
   said information processing program causes the computer of said information processing apparatus to further perform transmitting and receiving condition determination which determines whether or not said degree of transmission and said degree of reception satisfy a predetermined condition, and displaying a mark in a first manner when said transmitting and receiving condition determination determines that said degree of transmission and said degree of reception satisfy said predetermined condition, and displaying a mark in a second manner different from the first manner when said transmitting and receiving condition determination determines that at least one of said degree of transmission and said degree of reception does not satisfy said predetermined condition.

7. The non-transitory storage medium according to claim 1, wherein
   said information processing program causes the computer of said information processing apparatus to further perform transmitting and receiving condition determination which determines whether or not said degree of transmission and said degree of reception satisfy a predetermined condition, and displaying a design in a third manner when said transmitting and receiving condition determination determines that said degree of transmission and said degree of reception satisfy said predetermined condition, and displaying a design in a fourth manner different from said third manner when said transmitting and receiving condition determination determines that at least one of said degree of transmission and said degree of reception does not satisfy said predetermined condition.

8. The non-transitory storage medium according to claim 7, wherein
   said transmitting and receiving condition determination determines that said predetermined condition is satisfied in a case that the number of transmissions of the data and the number of receptions of the data are equal to or more than a constant number, and said data transmission and said data reception are performed during a predetermined period, and determines that said predetermined condition is not satisfied in a case that at least any one of the number of transmissions of the data and the number of receptions of the data is less than the constant number or in a case that at least one of said data transmission and said data reception is not performed during the predetermined period.

9. An information processing method including:
   (a) transmitting data to an information processing apparatus;
   (b) detecting a degree of transmission of the data transmitted in (a);
   (c) receiving data from said information processing apparatus;
   (d) detecting a degree of reception of the data received in (c)
   (e) displaying on a display a first design set and registered by a user of own information processing apparatus and a second design set and registered by a user of said information processing apparatus, and
   (f) displaying on said display a mark having a design of the manner that individually identifies the degree of transmission detected in (b) and the degree of reception detected in (d) between said first design and said second design.

10. An information processing system comprising a plurality of information processing apparatuses, each information processing apparatus comprising a computer configured to perform at least:

transmitting data to another information processing apparatus;

detecting a degree of transmission of the transmitted data;

receiving data from said another information processing apparatus;

detecting a degree of reception of the received data;

displaying on a display a first design set and registered by a user of own information processing apparatus and a second design set and registered by a user of said another information processing apparatus, and displaying on said display a mark having a design of the manner that individually identifies the detected degree of transmission and the detected degree of reception between said first design and said second design.

11. An information processing apparatus comprising a computer configured to perform at least:

transmitting data to another information processing apparatus;

detecting a degree of transmission of the transmitted data;

receiving data from said another information processing apparatus;

detecting a degree of reception of the received data;

displaying on a display a first design set and registered by a user of own information processing apparatus and a second design set and registered by a user of said another information processing apparatus, and displaying on said display a mark having a design of the manner that individually identifies the detected degree of transmission and the detected degree of reception between said first design and said second design.

\* \* \* \* \*